United States Patent
Hoshizuki et al.

(10) Patent No.: US 12,494,895 B2
(45) Date of Patent: Dec. 9, 2025

(54) ENCRYPTION PROCESSING APPARATUS AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 71 days.

(21) Appl. No.: 18/658,429

(22) Filed: May 8, 2024

(65) Prior Publication Data

US 2024/0297780 A1 Sep. 5, 2024

Related U.S. Application Data

(63) Continuation of application No. PCT/JP2022/033797, filed on Sep. 8, 2022.

(30) Foreign Application Priority Data

Nov. 15, 2021 (JP) ................................. 2021-185518

(51) Int. Cl.
*H04L 29/06* (2006.01)
*H04L 9/00* (2022.01)
(Continued)

(52) U.S. Cl.
CPC ............ *H04L 9/008* (2013.01); *H04L 9/0618* (2013.01); *H04L 9/3093* (2013.01)

(58) Field of Classification Search
CPC ..... H04L 9/008; H04L 9/0618; H04L 9/3093; H04L 9/30; G06F 17/10; G06F 21/60; G09C 1/00
See application file for complete search history.

(56) References Cited

U.S. PATENT DOCUMENTS 9,083,526 B2 * 7/2015 Gentry .................... H04L 9/008
11,991,266 B2 * 5/2024 Joye ....................... H04L 9/3093
(Continued)

FOREIGN PATENT DOCUMENTS

JP 2021083038 A * 5/2021

OTHER PUBLICATIONS

Bourse, et al., "Fast Homomorphic Evaluation of Deep Discretized Neural Networks", Lecture Notes in Computer Science, vol. 10993, 2018, pp. 483-512 (Year: 2018).*
(Continued)

*Primary Examiner* — Harunur Rashid
(74) *Attorney, Agent, or Firm* — Osha Bergman Watanabe & Burton LLP

(57) ABSTRACT

An encryption processing apparatus processes a fully homomorphic ciphertext and includes a processor performing the following processes. The processor performs a homomorphic operation involved in an operation for transforming coordinates of a point on a plane from orthogonal coordinates to polar coordinates with respect to a ciphertext and applies a predetermined polynomial to obtain a new ciphertext. The processor obtains a new ciphertext corresponding to a square of an x-coordinate value of the point by using a first polynomial, obtains a new ciphertext corresponding to a square of a y-coordinate value of the point by using a second polynomial, and applies a predetermined polynomial to a ciphertext obtained by a homomorphic operation between the new ciphertext corresponding to the square of the x-coordinate value and the new ciphertext corresponding to the square of the y-coordinate value, to obtain a ciphertext corresponding to a distance of the point from the origin.

12 Claims, 8 Drawing Sheets

(51) Int. Cl.
  *H04L 9/06* (2006.01)
  *H04L 9/30* (2006.01)

(56) References Cited

U.S. PATENT DOCUMENTS

| | | | | |
|---|---|---|---|---|
| 2013/0170640 | A1* | 7/2013 | Gentry | H04L 9/008 380/30 |
| 2018/0375639 | A1* | 12/2018 | Lauter | H04L 9/008 |
| 2021/0328766 | A1* | 10/2021 | No | H04L 9/3093 |
| 2023/0396409 | A1* | 12/2023 | Joye | G06N 3/048 |
| 2024/0267222 | A1* | 8/2024 | Chillotti | H04L 9/008 |

OTHER PUBLICATIONS

Carpov et al., "New techniques for multi-value input homomorphic evaluation and applications" howpublished = {Cryptology {ePrint} Archive, Paper 2018/622}, year = {2018}, p. 1-20 (Year: 2018).*

I. Chillotti et al; "TFHE: Fast Fully Homomorphic Encryption over the Torus"; Cryptology ePrint Archive, pp. 1-62; Apr. 2, 2019 (64 pages).

International Search Report issued in corresponding International Application No. PCT/JP2022/033797, mailed on Nov. 22, 2022 (7 pages).

Written Opinion issued in corresponding International Application No. PCT/JP2022/033797, mailed on Nov. 22, 2022 (6 pages).

F. Bourse et al; "Fast Homomorphic Evaluation of Deep Discretized Neural Networks"; Lecture Notes in Computer Science, vol. 10993, pp. 485-512; 2018 (30 pages).

A. Guimaraes et al; "Revisiting the functional bootstrap in TFHE"; IACR Transactions on Cryptographic Hardware and Embedded Systems, vol. 2021, No. 2, pp. 229-253; Feb. 23, 2021 (25 pages).

H. Okada et al; "Integer-Wise Functional Bootstrapping on TFHE: Applications in Secure Integer Arithmetics"; Information, vol. 12, No. 297, pp. 1-18; Jul. 26, 2021 (18 pages).

Office Action issued in counterpart Japanese Patent Application No. 2021-185518 mailed on Nov. 22, 2022 (11 pages).

* cited by examiner

FIG.3     CALCULATION OF DECLINATION ANGLE θ
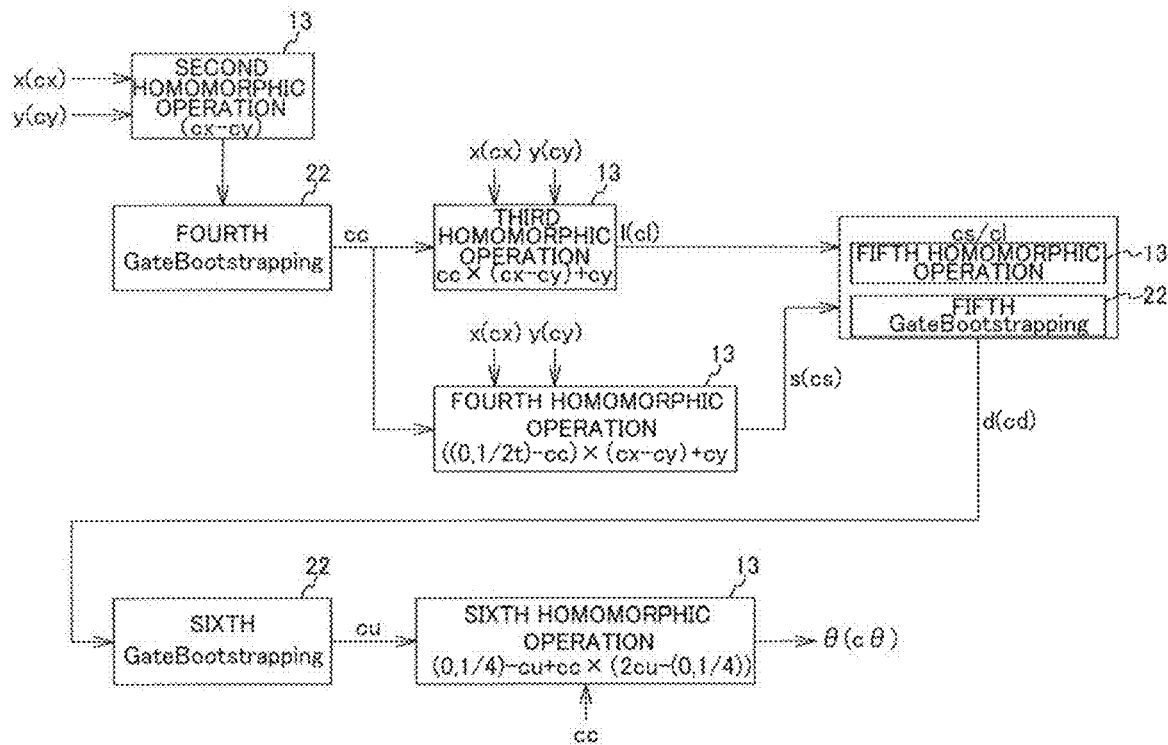
FIG.4
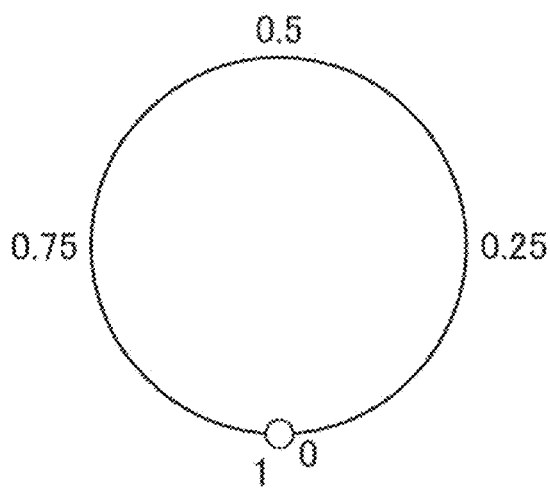

ENCRYPTION PROCESSING APPARATUS AND ENCRYPTION PROCESSING METHOD

CROSS-REFERENCE TO RELATED APPLICATION

This application is a continuation application of International Application PCT/JP2022/033797 filed on Sep. 8, 2022 and designated the U.S., the entire contents of which are incorporated herein by reference in their entirety.

FIELD

The embodiments discussed herein are related to an encryption processing apparatus, an encryption processing method, and a non-transitory computer-readable recording medium.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are known an additive homomorphic encryption that performs only an additive operation (addition and subtraction) while a finite cyclic group is regarded as an integer, and multiplicative homomorphic encryption that performs only a multiplicative operation (multiplication) while a finite cyclic group is regarded as an integer.

Since the finite cyclic group can be multiplied by an integer by repeating addition, a plaintext can be multiplied by an integer, and the plaintext can be exponentiated by repeating multiplication.

There is also known fully homomorphic encryption (FHE) that allows both an additive operation and a multiplicative operation to be performed while ciphertexts remain encrypted.

One of known fully homomorphic encryption techniques is fully homomorphic encryption based on the LWE (Learning with Errors) problem, which is configured by adding a small error to a plaintext in an encryption process to such an extent that there is no problem in decryption.

In fully homomorphic encryption based on the LWE problem, an error is accumulated as an operation is performed, and therefore bootstrapping for reducing an error component while the error component remains encrypted is performed before the error becomes too large to be decrypted.

The computation time of bootstrapping occupies most of the computation time included in fully homomorphic encryption. Further, the amount of computation is large in bootstrapping, because bootstrapping handles a large amount of data. Therefore, an operation of fully homomorphic encryption may not be able to obtain the operation result within a practical time.

A method for drastically improving this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "Chillotti et al., 2020" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Chillotti et al., 2020 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as a plaintext. For example, Integerwise Functional Bootstrapping on TFHE, 2020, Hiroki Okada, Shinsaku Kiyomoto, and Carlos Cid can be mentioned (referred to as "Okada et al., 2020" in the following descriptions).

If TFHE can be used as homomorphic encryption that can be subjected to four arithmetic operations in the Inter-wise type, more efficient processing can be performed as compared with a bit-by-bit computation.

However, in TFHE applied to the Integer-wise type, it is necessary to divide the range from 0 to 1 of the circle group $\{T\}$ more finely as the value of the plaintext (integer) stored in a TLWE ciphertext becomes larger, and it is also necessary to make an error smaller also because of a problem of an error in decryption which will be described later. In this case, there is a problem that the security strength tends to decrease.

It is an object of an aspect of the present invention to ensure the security of Integer-wise type TFHE while making a value of a plaintext (integer) to be stored in a ciphertext as large as possible.

SUMMARY

According to an aspect of the embodiments, an encryption processing apparatus processes a ciphertext, the ciphertext being a fully homomorphic ciphertext that has, as a plaintext associated with an integer, a value obtained by adding an error with a predetermined variance to a predetermined value and that is able to be subjected to a predetermined operation between integers without being decrypted. The encryption processing apparatus includes a processor that performs the following processes. The processor performs a homomorphic operation involved in a predetermined operation on a ciphertext, and applies a predetermined polynomial to a ciphertext to obtain a new ciphertext. The predetermined operation is an operation for transforming coordinates of a point on a plane from orthogonal coordinates to polar coordinates. The processor applies a first polynomial to a first ciphertext corresponding to an x-coordinate value of the point to obtain a new ciphertext corresponding to a square of the x-coordinate value. The processor applies a second polynomial to a second ciphertext corresponding to a y-coordinate value of the point to obtain a new ciphertext corresponding to a square of the y-coordinate value. The processor applies a predetermined polynomial to a ciphertext obtained by a homomorphic operation between the new ciphertext corresponding to the square of the x-coordinate value and the new ciphertext corresponding to the square of the y-coordinate value, to obtain a ciphertext corresponding to a distance of the point from an origin.

According to an aspect of the embodiments, as one aspect, it is possible to ensure the security of Integer-wise type TFHE.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIG. 3 is a detailed explanatory diagram of operation processes of the encryption processing apparatus based on the functional configuration in FIG. 1;

FIG. 4 is an image diagram for explaining a circle group that TLWE encryption has as a plaintext;

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value logical operation.

Figure 1:
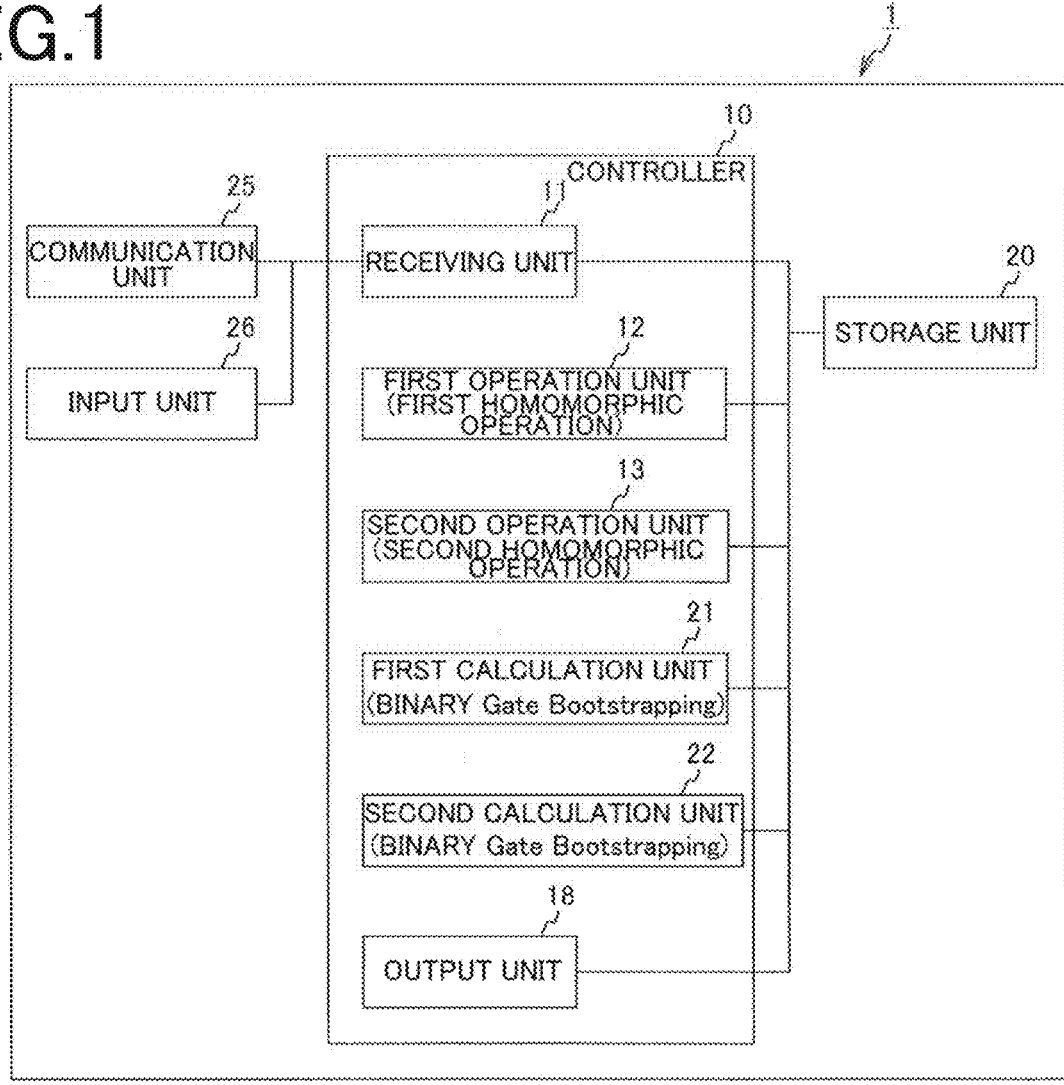
FIG. 1 is an explanatory diagram of a functional configuration of an encryption processing apparatus of the present embodiment.

FIG. 1 is an explanatory diagram of a functional configuration of an encryption processing apparatus of the present embodiment.

An encryption processing apparatus 1 includes a controller 10, a storage unit 20, a communication unit 25, and an input unit 26.

The controller 10 includes a receiving unit 11, a first operation unit 12, a second operation unit 13, a first Bootstrapping unit (first calculation unit) 21, a second Bootstrapping unit (second calculation unit) 22, and an output unit 18.

The receiving unit 11 receives input of a ciphertext that is an object of an operation, via the communication unit 25 or the input unit 26. Alternatively, the receiving unit 11 receives input of a ciphertext from another process performed by the encryption processing apparatus 1.

The first operation unit 12 performs a first homomorphic operation involved in calculation of a distance r (described later).

The first Bootstrapping unit 21 performs first to third Gate Bootstrapping processes involved in calculation of the distance r to output a new ciphertext.

The second operation unit 13 performs second to sixth homomorphic operations involved in calculation of a declination angle θ (described later).

The second Bootstrapping unit 22 performs fourth to sixth Gate Bootstrapping processes involved in calculation of the declination angle θ to output a new ciphertext.

The first operation unit 12 and the second operation unit 13 are arithmetic processing units that realize homomorphic operations for polar coordinate transformation by software. The first Bootstrapping unit 21 and the second Bootstrapping unit 22 are arithmetic processing units that realize Gate Bootstrapping for polar coordinate transformation by software.

At least one of the first operation unit 12, the second operation unit 13, the first Bootstrapping unit 21, and the second Bootstrapping unit 22 may be realized by hardware.

The output unit 18 outputs a final operation result to outside of the encryption processing apparatus 1 or to another processing process performed by the encryption processing apparatus 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing apparatus 1 to a network, thereby enabling communication between the encryption processing apparatus 1 and an external apparatus to be performed.

The encryption processing apparatus 1 can serve as a database server by storing the encrypted encryption database 60 in the storage unit 20 and including the communication unit 25.

In this case, the encryption processing apparatus 1 can receive an encrypted query from a terminal apparatus as the external apparatus, search the encrypted encryption database 60, and send an encrypted search result to the terminal apparatus.

The input unit 26 inputs a ciphertext that is an object of arithmetic processing and a query for the encrypted database 60, to the encryption processing apparatus 1.

Figure 2:
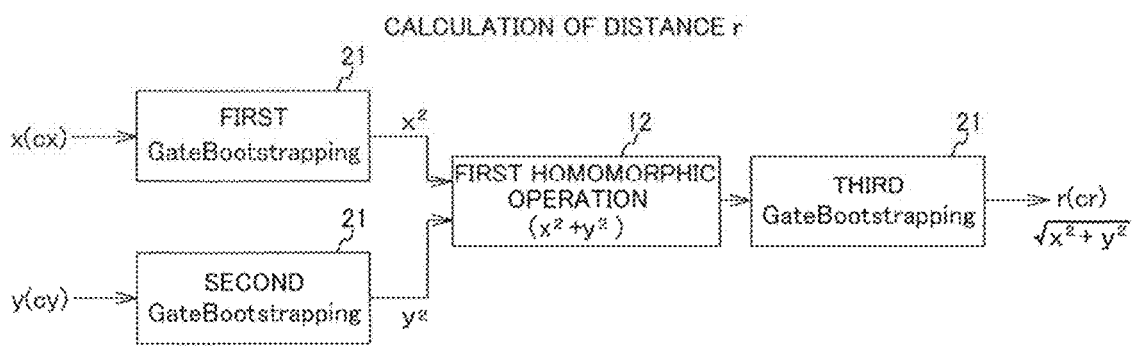
FIG. 2 is a detailed explanatory diagram of operation processes of the encryption processing apparatus based on the functional configuration in FIG. 1.

FIGS. 2 and 3 are detailed explanatory diagrams of operation processes of an encryption processing apparatus based on the functional configuration in FIG. 1.

FIG. 2 illustrates an operation process of obtaining a ciphertext cr of the distance r of a point P from the origin from ciphertexts cx and cy of x- and y-coordinate values of the point P.

FIG. 3 illustrates an operation process of obtaining a ciphertext cθ of the declination angle θ of the point P from ciphertexts cx and cy of the x- and y-coordinate values of the point P.

In the descriptions of FIGS. 2 and 3, all the ciphertexts cx and cy input to the encryption processing apparatus 1 and the ciphertexts cr and cθ output therefrom are TLWE ciphertexts presented in the aforementioned paper by Chillotti et al., 2020 (hereinafter, referred to as the aforementioned paper).

The configurations illustrated in FIGS. 2 and 3 use Gate Bootstrapping on TFHE presented in the aforementioned paper. Gate Bootstrapping will be described in detail below.

In FIG. 2, the encryption processing apparatus 1 inputs the ciphertext cx to the first Bootstrapping unit 21 and performs the first Gate Bootstrapping. The output of the first Bootstrapping is a ciphertext of $x^2$.

The encryption processing apparatus 1 also inputs the ciphertext cy to the second Bootstrapping unit 22 and performs the second Gate Bootstrapping. The output of the second Bootstrapping is a ciphertext of $y^2$.

The encryption processing apparatus 1 inputs the ciphertext of $x^2$ and the ciphertext of $y^2$ to the first operation unit 12, performs the first homomorphic operation, inputs the output of the first homomorphic operation to the first Bootstrapping unit 21, performs the third Gate Bootstrapping, and outputs the ciphertext cr of $r=\sqrt{(x^2+y^2)}$.

In FIG. 3, the encryption processing apparatus 1 inputs the ciphertext cx and the ciphertext cy to the second operation unit 13, performs the second homomorphic operation cx−cy, inputs the output of the second homomorphic operation to the second Bootstrapping unit 22, performs the fourth Gate Bootstrapping, and outputs the ciphertext cc.

The encryption processing apparatus 1 inputs the ciphertext cc, the ciphertext cx, and the ciphertext cy to the second operation unit 13 and performs the third homomorphic operation ccx(cx−cy)+cy, thereby obtaining a ciphertext cl.

The second operation unit 13 performs an operation of homomorphic subtraction cx−cy and an operation of adding cy in a homomorphic manner. Multiplication between the binary ciphertext cc and the result of the operation cx−cy which is an integer ciphertext can be executed by a binary operation unit separately by the method described below.

The encryption processing apparatus 1 also inputs the ciphertext cc, the ciphertext cx, and the ciphertext cy to the second operation unit 13 and performs the fourth homomorphic operation $((0, 1/2t)-cc)\times(cx-cy)+cy$ or cx+cy−cl, thereby obtaining a ciphertext cs.

Multiplication between the result of the operation (0, 1/2t)−cc, which is a binary ciphertext, and the result of the operation cx−cy, which is an integer ciphertext, can be executed by a binary operation unit separately by the method described below.

The encryption processing apparatus 1 performs an operation (the ciphertext cs/the ciphertext cl) (i.e., division between TLWE ciphertexts) including the fifth homomorphic operation and the fifth Gate Bootstrapping by the second operation unit 13 and the second Bootstrapping unit 22, thereby outputting a ciphertext cd of a ratio d of x and y.

The encryption processing apparatus 1 inputs the ciphertext cd to the second Bootstrapping unit 22 and performs the sixth Gate Bootstrapping for obtaining the arctangent of the ratio d, thereby outputting a ciphertext cu.

The encryption processing apparatus 1 inputs the ciphertexts cu and cc to the second operation unit 13 and performs the sixth homomorphic operation $(0, 1/4)-cu+cc\times(2cu-(0, 1/4))$, thereby obtaining the ciphertext $c\theta$ of the declination angle $\theta$.

Multiplication between the binary ciphertext cc and the result of the operation 2cu−(0, 1/4), which is an integer ciphertext, can be executed by a binary operation unit separately by the method described below.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

FIG. 4 is an image diagram for explaining a circle group that TLWE encryption has as a plaintext.

TLWE encryption has a real number that moves forward from 0 with a real number precision and, when reaching 1, returns to 0. TLWE encryption regards any point on a circle group {T} illustrated in FIG. 5 as a plaintext, and uses a range near 0 (including an error) and a range near (including an error) as a plaintext.

The point on the circle group {T} is also described as an "element" in the present specification.

An encryption processing apparatus handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group {T}. In addition, a private key [s] obtained by collecting N values that can be 0 or 1 is prepared.

Assuming that a random number in the Gaussian distribution (the normal distribution) in which an average value is a plaintext and a variance is preset to a is e, an example of a TLWE ciphertext is a pair ([a], [s]·[a]+e).

An average value of e when an infinite number of TLWE ciphertexts are created for the same plaintext μ is a plaintext μ, where μ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s(([a], b)=b-[s]\cdot[a]=e$ is a function of decrypting the TLWE ciphertext.

Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $$\varphi_s(([a] + [a'], b + b')) = (b + b') - [s] \cdot ([a] + [a']) =$$
$$(b - [s] \cdot [a]) + (b' - [s] \cdot [a']) = \varphi_s([a], b) + \varphi_s([a'], b').$$

It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a trivial ciphertext such as $([0], \mu)$ is a TLWE ciphertext that can be decrypted with any private key, that is, a ciphertext that can be decrypted with any private key to provide the same plaintext.

In $([0], \mu)$, $[0]$ represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext $([0], \mu)$, the private key $[s]$ is multiplied by the zero vector $[0]$ to disappear as represented by $\varphi_s(([0], \mu)) = \mu - [s] \cdot 0 = \mu$. The plaintext is thus obtained easily. Such a ciphertext is a trivial ciphertext with regard to the plaintext.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th degree polynomial is generally represented by $a_n x^n + a_{n-1} x^{n-1} + \ldots + a_0$.

These all sets form a commutative group for a sum of polynomials $f(x) + g(x)$.

Further, a product of polynomials $f(x)g(x)$ has properties identical to those of the commutative group except that an inverse element is not necessarily present. Such a structure is called "monoid".

Regarding the sum and the product of polynomials, the distributive property is established as follows.

$$f(x)\{g(x) + g'(x)\} = f(x)g(x) + f(x)g'(x)$$

Therefore, when the sum and the product of polynomials are defined using polynomials as elements, a "ring" is formed, which is called "polynomial ring".

TFHE uses a polynomial ring including the circle group $\{T\}$ as coefficients, and such a polynomial ring is represented as $T[X]$.

When a polynomial $T(X)$, which is a polynomial ring, is decomposed into $T[X](X^n+1) + T[X]$, and only remainders are extracted and collected, a factor ring of a polynomial ring is obtained because the remainders also form a "ring".

In TFHE, a factor ring of a polynomial ring is represented as $T[X]/(X^n+1)$.

A polynomial $F(X) = \mu X^{n-1} + \mu X^{n-2} + \ldots + \mu X + \mu$ is extracted by using a desired coefficient (belongs to T) as an element of the factor ring of the polynomial ring $T[X]/(X^n+1)$.

When the element $F(X)$ of the factor ring of the polynomial ring is multiplied by X, $\mu X^{n-1} + \mu X^{n-2} + \ldots + \mu X - \mu$ is obtained, the coefficient of the top term appears as a constant term with a sign reversed from positive to negative.

When multiplication by X is further performed, the same phenomenon happens again as represented by $\mu X^{n-1} + \mu X^{n-2} + \ldots + \mu X^2 - \mu X - \mu$ (the coefficient of the top term appears as a constant term with a sign reversed from positive to negative).

When this multiplication is repeated n times, $-\mu X^{n-1} - \mu X^{n-2} \ldots -\mu X - \mu$ is obtained, so that the coefficients of all terms become negative.

When multiplication by X is further continued, the coefficient of the top term becomes positive from negative and appears as a constant term as represented by $$-\mu X^{n-1} - \mu X^{n-2} \ldots - \mu X + \mu,$$
$$-\mu X^{n-1} - \mu X^{n-2} \ldots + \mu X + \mu.$$

When multiplication by X is repeated 2n times in total, the multiplication result returns to the original element of the factor ring of the polynomial ring $F(X) = \mu X^{n-1} + \mu X^{n-2} + \ldots + \mu X + \mu$. As described above, the highest-order coefficient $(\mu)$ appears as the lowest-order constant term with a reversed sign $(-\mu)$, and terms are shifted by one in whole.

That is, the polynomial $F(X) = \mu X^{n-1} + \mu X^{n-2} + \ldots + \mu X + \mu$ is a finite cyclic group of order 2n in a ring that is the factor ring of the polynomial ring $T[X]/(X^n+1)$.

In TFHE, an encryption processing apparatus achieves fully homomorphic encryption by using such properties of the polynomial $F(X)$ based on a factor ring of a polynomial ring.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of a polynomial ring $T[X]/(X^n+1)$ described above.

In order to obtain TRLWE encryption, elements of the factor ring of a polynomial ring $T[X]/(X^n+1)$ are selected at random.

In fact, n coefficients in an (n−1)th degree polynomial are selected as uniformly distributed random numbers from the circle group $\{T\}$.

When the degree of the polynomial is n−1, the polynomial is not divided by $X^n+1$, and it is not necessary to consider a remainder. Therefore, it is assumed that the (n−1)th degree polynomial is a polynomial $a(X)$.

A polynomial $s(X)$ used as a private key is structured as follows, by collecting n values each of which can be 0 or 1 at random.

$$s(X) = s_{n-1} X^{n-1} + s_{n-2} X^{n-2} + \ldots s_1 X + s_0$$

Assuming that n random numbers $e_i$ are random numbers in the Gaussian distribution (the normal distribution) in which an average value is a plaintext $\mu$; and a variance is $\alpha$, the following polynomial $e(X)$ is structured from these random numbers.

$$e(X) = e_{n-1} X^{n-1} + e_{n-2} X^{n-2} + \ldots e_1 X + e_0$$

Decomposition of $s(X) \cdot a(X)+e(X)$ is performed into $f(X)$ $(X^n+1)+b(X)$, and $b(X)$ is obtained.

Consequently, $(a(X), b(X))$ is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, $g(X)$ is determined in such a manner that $\varphi_s$ becomes an element of $T[X]/(X^n+1)$ serves as a decryption function, where $\varphi_s((a(X), b(X))=b(X)-s(X) \cdot a(X)+g(X)(X^n+1)$, as in TLWE encryption.

[Gadget Decomposition]

Gadget Decomposition is described.

Figure 5:
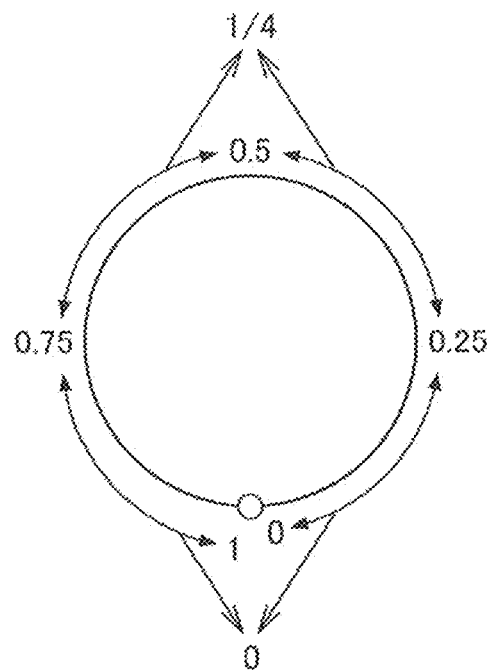
FIG. 5 is an operation image diagram of binary Gate Bootstrapping.

A coefficient in a polynomial used in a TRLWE ciphertext is a real number that is an element of the circle group $\{T\}$ in FIG. 5 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial $F(X)$ of a TRLWE ciphertext is 2, one unit of decomposition is $Bg=2^2$, and decomposition into $l=3$ elements is performed. At this time, each element is arranged to enter between $-Bg/2$ and $Bg/2$.

A TRLWE ciphertext is a combination of two polynomials like $(a(X), b(X))$ as described above. Therefore, a TRLWE ciphertext d can be written as $$d = [0.75X^2 + 0.125X + 0.5, 0.25X^2 + 0.5X + 0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since $0.75=-0.25$ is established on the circle group $\{T\}$, decomposition can be performed as follows.

$$d = [0.75X^2 + 0.125X + 0.5,$$
$$0.25X^2 + 0.5X + 0.375] = [-0.25X^2 + 0.125X + 0.5,$$
$$0.25X^2 + 0.5X + 0.25 + 0.125] = [0.25 \times (-X^2 + 2) + 0.25^2 \times 2X +$$
$$0.25^3 \times 0, 0.25 \times (X^2 + 2X + 1)9 + 0.25^2 X^2 \times 2 + 0.25^3 \times 0]$$

Therefore, when Gadget Decomposition is performed, a vector $$Dec(d) = [-X^2 + 2, 2X, 0, X^2 + 2X + 1, 2, 0]$$

is obtained.

An operator H of inverse transform from a vector to a ciphertext is also defined.

When the description is provided based on the example described above, $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

the above matrix becomes the operator H of inverse transform. A TRLWE ciphertext d' is obtained by performing an operation $Dec(d) \cdot H$. The lower bits are rounded off.

It can also be said that an operation of obtaining $[v]$ that makes $\|d-[v] \cdot H\|$ minimum with respect to the TRLWE ciphertext d is Gadget Decomposition. Here, $\|\ \|$ is a vector norm (length).

Ciphertexts $Zi=(a(X), b(X))$ formed by polynomials in which all coefficients of $e(X)$ have an average value of 0 and a variance is a are created. The number of the created ciphertexts is $2l$.

The plaintext $\mu$ is encrypted in the following manner, whereby the following ciphertext k is obtained.

$$k = \begin{pmatrix} Z_1 \\ Z_2 \\ \vdots \\ Z_{2l} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key [s] (Nth degree) used for TLWE ciphertexts, each element of a private key [s'] for encrypting the private key [s] is selected to be either of two values, i.e., 0 or 1 for use in Gate Bootstrapping.

It is necessary to make the degree of the private key [s'] the same as the degree n of polynomials used in TRLWE encryption.

The TRGSW ciphertext BK is created for each element of the private key [s].

When decryption with the private key [s'] is performed, 21 TRLWE ciphertexts Zj are created where $(\varphi_s \cdot (Zj)=0$ is satisfied.

$BK_i$ is then represented by $$BK_i = \begin{pmatrix} Z_1 \\ Z_2 \\ \vdots \\ Z_{2l} \end{pmatrix} + s_i \cdot H$$

as in the above-described configuration of the TRGSW ciphertext.

N TRGSW ciphertexts having this configuration are prepared, where N is the same as the degree of the private key [s]. A set of the thus prepared TRGSW ciphertexts is referred to as "Bootstrapping Key".

A cross product of the TRGSW ciphertext BKi and the TRLWE ciphertext d is defined as follows.

$BKi \times d = Dec(d) \cdot BKi$

Gadget Decomposition is an operation of obtaining [v] that makes ||d−[v]·H|| minimum with respect to the TRLWE ciphertext d.

Therefore, by using [v]=Dec(d) and an error ($\varepsilon_a(X)$, $\varepsilon_b(X)$), [v]·H=d+($\varepsilon_a(X)$, $\varepsilon_b(X)$) can be written.

As a result, BKi×d=Dec(d)·BKi $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates a dot product, and [v]·H=d+ ($\varepsilon_a(X)$, $\varepsilon_b(X)$) is substituted into the right side, $$= \sum_{j=1}^{2\ell} v_j \times Z_j + s_i \times (d + (\epsilon_a(X), \epsilon_b(X))) =$$

$$\sum_{j=1}^{2\ell} v_j \times Z_j + s_i \times d + s_i \times (\epsilon_a(X), \epsilon_b(X))$$

is obtained, and becomes the same as calculation of a sum of the following three ciphertexts c1, c2, and c3.

$$c_1 = \sum_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_s(c_1)$ is 0.

In addition, $\varphi_s(c_3)$ obtained by decryption is set to be sufficiently small also in the subsequent operations, because the magnitude of the absolute value of a plaintext can be limited by a system parameter.

In this case, $\varphi_s(BKi \times d) = \varphi_s(s_i \times d)$ is obtained, but the calculation result is the sum of the above three ciphertexts c1, c2, and c3 regardless of whether si is 0 or 1. Whether si is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1 - d_0$ is substituted for d, and $d_0$ is finally added, the following CMux function is completed.

CMux($BK_i$, $d_0$, $d_1$)=$BKi \times (d_1-d_0)+d_0$=Dec($d_1-d_0$) ·$BK_i+d_0$ The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

FIG. 5 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (1/4) or 0.75 (3/4) to 1 on the circle group {T} in FIG. 4 is converted to a TLWE ciphertext 0, and a plaintext in a section from 0.25 (1/4) to 0.75 (3/4) is converted to a ciphertext 0.25 (1/4).

An error added to the plaintext in this conversion is any error in a range of 1/16.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, φs(c') is a plaintext obtained by applying a decryption function to the following LWE ciphertext c'.

In BlindRotate, the following polynomial T(X)

$T(X)=F(X) \cdot X^{n/2}$ is prepared, which is obtained by multiplying the following polynomial F(X)

$$F(X) = \mu X^{n-1} + \mu X^{n-2} + \ldots \mu X + \mu$$

where $\mu=1/8$, that forms the above-described finite cyclic group and serves as a test vector, by $X^{n/2}$.

It is assumed that there is a TLWE ciphertext c obtained by encrypting the plaintext µ1 with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, µ1'=$\varphi_s$(c')≈2n×$\varphi_s$(c)=2nµ1 is obtained. As n becomes larger, an error becomes smaller relatively.

A trivial TRLWE ciphertext (0, T(X)) whose plaintext is the polynomial T(X) is prepared, and it is assumed that $A_0=X^{-b'} \times (0, T(X))=(0, X^{-b'} \times T(X))$, where 0 indicates a 0th degree polynomial 0. Since b' is an integer, a power of X can be defined naturally.

Subsequently, $A_i$=CMux($BK_i$, $A_{i-1}$, $X^{a'_i}A_{i-1}$) is calculated in turn by using $BK_i$ that is the above-described Bootstrapping Key. Since a'i is an integer also in this expression, a power of X can be defined naturally.

Accordingly, the plaintext is not changed as it is when si is 0, and multiplication by $X^{a'i}$ is performed in turn when si is 1.

Therefore, when calculation is repeated as represented by $$\phi_{s'}(A_0) = X^{-b'} T(X)$$

$$\phi_{s'}(A_1) = X^{s_1 a'_1 - b'} T(X)$$

$$\phi_{s'}(A_2) = X^{s_2 a'_2 + s_1 a'_1 - b'} T(X),$$

then $\varphi^{s'}(A_n)=X^{\Sigma_{i=1}^{N} s_i \times a'_i - b'} T(X)$ is obtained.

Here, $$\sum_{i=1}^{N} s_i \times a'_i - b'$$

is equal to the decryption function φs(c') with a sign reversed. Therefore, $$\varphi_{s'}(A_n) = X^{-\phi_s(c')}T(X)$$

is obtained. Here, φx'($A_1$) is a ciphertext of a polynomial obtained by multiplying μ1' times the polynomial T(X) by $X^{-1}$.

In association with the plaintext μ1 of the TLWE ciphertext c related to BlindRotate, unique values (up to 2n values including n coefficients and n values obtained by reversing the signs of the coefficients) in accordance with the number of times μ1' (=2nμ1) of multiplying the polynomial T(X) by X is obtained, and therefore this can be regarded as a kind of Look Up Table.

(2) SampleExtract

In the plaintext polynomial $\varphi_s(A_n)$ obtained by decrypting the TRLWE ciphertext $A_n$ obtained by BlindRotate in (1), n/2−$\varphi_s$(c') terms from the lowest term have a coefficient of −μ. When $\varphi_s(A_n)$ is negative, coefficients are −μ from the highest term in turn conversely.

When attention is paid only to a constant term of the plaintext polynomial $\varphi_s(A_n)$ obtained by decrypting the TRLWE ciphertext $A_n$, the constant term is μ if $\varphi_s$(c') is equal to or greater than n/2 and less than 3n/2, that is, $\varphi_s$(c) is 1/2±1/4. Otherwise, i.e., if $\varphi_s$(c) is ±1/4, the constant term is −μ.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials $$A(X) = \sum_{i=1}^{n} a_i X^{i-1}$$
$$B(X) = \sum_{i=1}^{n} b_i X^{i-1},$$

where n is the degree.

When decryption with the private key [s'] is performed, the expression can be expanded by putting a polynomial of the private key as $$S'(X) = \sum_{j=1}^{n} s'_j X^{j-1}$$

Then, $$\phi_{s'}(c) = B(X) - S'(X) \cdot A(X) = \sum_{i=1}^{n} b_i X^{i-1} - \sum_{i=1}^{n}\sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n}\sum_{j=1}^{n} a_i s'_j X^{(i+j-2)} =$$
$$\sum_{i=1}^{n} b_i X^{i-1} - \sum_{i=1}^{n}\sum_{j=i-1}^{n+i-2} a_i s'_{j-i+2} X^j =$$
$$\sum_{i=1}^{n} b_i X^{i-1} - \sum_{i=1}^{n}\sum_{j=i-1}^{n-1} a_i s'_{j-i+2} X^j - \sum_{i=1}^{n}\sum_{j=n}^{n+i-2} a_i s'_{j-i+2} X^j =$$
$$\sum_{j=1}^{n} b_i X^{j-1} - \sum_{j=0}^{n-1}\sum_{i=1}^{j+1} a_i s'_{j-i+2} X^j - \sum_{j=n}^{2n-2}\sum_{i=j-n+2}^{n} a_i s'_{j-i+2} X^j =$$
$$\sum_{j=0}^{n-1} b_{j+1} X^j - \sum_{j=0}^{n-1}\sum_{i=0}^{j} a_{i+1} s'_{j-i+1} X^j -$$
$$\sum_{j=0}^{n-2}\sum_{i=j-n+1}^{-1} a_{i+n+1} s'_{j-i+1} X^{j+n} =$$
$$\sum_{j=0}^{n-2} b_{j+1} X^j + b_n X^{n-1} - \sum_{j=0}^{n-2}\sum_{i=0}^{j} a_{i+1} s'_{j-i+1} X^{j+n} -$$
$$\sum_{i=0}^{n-1} a_{i+1} s'_{n-i} X^{n-1} - \sum_{j=0}^{n-2}\sum_{i=j-n+1}^{-1} a_{i+n+1} s'_{j-i+1} X^{j+n} =$$
$$\sum_{j=0}^{n-2} \left(b_{j+1} X^j - \sum_{i=0}^{j} a_{i+1} s'_{j-i+1} X^j - \sum_{i=j-n+1}^{-1} a_{i+n+1} s'_{j-i+1} X^{j+n}\right) +$$
$$b_N X^{n-1} - \sum_{i=0}^{n-1} a_{i+1} s'_{n-i} X^{n-1}$$

Since this is "factor ring of polynomial ring", a remainder when this is divided by ($X^n$+1) is calculated. Then, $$\sum_{j=0}^{n-2} \left(b_{j+1} X^j - \sum_{i=0}^{j} a_{i+1} s'_{j-i+1} X^j + \sum_{i=j-n+1}^{-1} a_{i+n+1} s'_{j-i+1} X^j\right) +$$
$$b_N X^{n-1} - \sum_{i=0}^{n-1} a_{i+1} s'_{n-i} X^{n-1} =$$
$$\sum_{j=0}^{n-2} \left(b_{j+1} - \sum_{i=0}^{j} a_{i+1} s'_{j-i+1} + \sum_{i=j-n+1}^{-1} a_{i+n+1} s'_{j-i+1}\right) X^j +$$
$$\left(b_n - \sum_{i=0}^{n-1} a_{i+1} s'_{n-i}\right) X^{n-1}$$

is obtained.

Further, when $$a'_i = \begin{cases} a_i & (i \geq 1) \\ -a_{i+n} & (\text{otherwise}) \end{cases}$$

is put, then $$= \sum_{j=0}^{n-2} \left(b_{j+1} - \sum_{i=0}^{j} a'_{i+1} s'_{j-i+1} - \sum_{i=j-n+1}^{-1} a'_{i+1} s'_{j-i+1}\right) X^j +$$
$$\left(b_N - \sum_{i=0}^{n-1} a'_{i+1} s'_{n-i}\right) X^{n-1} =$$
$$\sum_{j=0}^{n-2} \left(b_{j+1} - \sum_{i=j-n+1}^{j} a'_{i+1} s'_{j-i+1}\right) X^j + \left(b_N - \sum_{i=0}^{n-1} a'_{i+1} s'_{n-i}\right) X^{n-1} =$$
$$\sum_{j=0}^{n-2} \left(b_{j+1} - \sum_{i=0}^{n-1} a'_{i+j-n+2} s'_{n-i}\right) X^j + \left(b_N - \sum_{i=0}^{n-1} a'_{i+1} s'_{n-i}\right) X^{n-1} =$$
$$\sum_{j=0}^{n-1} \left(b_{j+1} - \sum_{i=0}^{n-1} a'_{i+j-n+2} s'_{n-i}\right) X^j$$

is obtained, and coefficients of respective terms in a plaintext polynomial are obtained from $$\phi_{s'}(c) = \sum_{j=0}^{n-1} \left(b_{j+1} - \sum_{i=0}^{n-1} a'_{i+j-n+2} s'_{n-i}\right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$\alpha''_i = \alpha'_{-i+2}$$

is put, the extracted coefficient can be transformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a''} = \phi_{s'}(\vec{a''}, b_1).$$

That is, when coefficients are extracted from the TRLWE ciphertext $A_n = (A(X), B(X))$ obtained by BlindRotate in (1) while the coefficients are set as $$a''_i = \begin{cases} a_1 & (i = 1) \\ -a_{-i+n+2} & \text{(otherwise)} \end{cases},$$

a new TLWE ciphertext ([a''], $b_1$) is obtained which has, as a plaintext, the same value as a constant term of a plaintext polynomial corresponding to the original TRLWE ciphertext $A_n$. This new TLWE ciphertext is the output of SampleExtract and has either of two types, i.e., $-\mu$ or $\mu$ as a plaintext.

A TLWE ciphertext cs=([a''], $b_1$)+([0], $\mu$) obtained by adding a trivial ciphertext ([0], $\mu$) of which plaintext is to the thus obtained TLWE ciphertext is obtained.

Specifically, since $\mu$ is 1/8 in the polynomial F(X) as a test vector, a ciphertext of $-1/8$ or 1/8 is obtained in this stage.

When a trivial TLWE ciphertext ([0], 1/8) of which a plaintext is $\mu=1/8$ is added to the output result of SampleExtract, $$-1/8 + 1/8 = 0$$

$$1/8 + 1/8 = 1/4$$

are established, and thus a new TLWE ciphertext cs having either of two values, i.e., 0 or 1/4 as a plaintext is obtained.

(3) KeySwitching

The TLWE ciphertext cs obtained by using SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1}, s'_i \times 2^{-2}, s'_i \times 2^{-3} \ldots$$

The private key is [s]. A "number of digits" t is a system parameter.

When decryption is performed with the private key [s], $$\phi_s(KS_{i,j}) = s'_i \times 2^{-j}$$

is obtained. This is a "KeySwitching key".

As described above, the TLWE ciphertext cs=([a], b) obtained in (2) is 0 or 1/4 obtained by encryption with the private key [s']. The number of elements of [a] is the same as that of the private key [s'] and is n.

When the elements are converted to t-bit fixed-point numbers one by one, the elements can be written in the following form.

$$a_i \approx \sum_{j=1}^{t} a_{i,j} \times 2^{-j}$$

Although an error is increased in this stage, the maximum value of the absolute value can be limited by a system parameter.

As main processing of KeySwitching, the following TLWE ciphertext cx is calculated.

$$cx = (\vec{0}, b) - \sum_{i=1}^{n} \sum_{j=1}^{t} a_{i,j} \times KS_{i,j}$$

Since the term ([0], b) is a trivial ciphertext, this term is b when being decrypted.

A result of decryption of the TLWE ciphertext cx is calculated as follows.

$$\phi_s(cx) = b - \sum_{i=1}^{n} \sum_{j=1}^{t} a_{i,j} \times s'_i \times 2^{-j} = b - \sum_{i=1}^{n} \sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j}$$

The expression obtained by decomposition into fixed-point numbers descried above is then substituted.

$$\approx b - \sum_{i=1}^{n} s'_i \times a_i = \phi_{s'}((\vec{a}, b)) = \phi_{s'}(c_s)$$

As a result, $$\phi_s(cx) \approx \phi_s(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\varphi_s(cx)$ is 0 when $\varphi_s(c)$ is in a range of $\pm 1/4$, and is 1/4 when $\varphi_s(c)$ is in a range of $1/2 \pm 1/4$.

By the processing described above, a TLWE ciphertext is obtained as a result of Gate Bootstrapping, which is either of two values, i.e., 0 or 1/4 and has any error within $\pm 1/16$.

The maximum value of the error does not depend on the TLWE ciphertext c that is the input, and is a value fixed by a system parameter.

Therefore, the system parameter is set in such a manner that the maximum value of the error is any value within ±1/16 that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within ±1/16.

The processing described above is processing of Gate Bootstrapping in TFHE.

As described above, TFHE is Bit-wise type homomorphic encryption that has zero or non-zero as a plaintext and enables a logical operation to be performed. However, the plaintext is a real number from 0 to 1 associated with the circle group {T}, as described with reference to FIG. 4. Therefore, by associating sections obtained by dividing the circle group {T} with integers in turn, TFHE can be applied as Integer-wise type homomorphic encryption having an integer as a plaintext.

The aforementioned paper states that a TLWE ciphertext used in TFHE is additive homomorphic for plaintexts on a circle group, and it is obvious that the TLWE ciphertext used in TFHE can be subjected to addition (subtraction).

Division can be performed by the method described below. When the division becomes possible, TFHE can be used as homomorphic encryption that can be subjected to four arithmetic operations in the Integer-wise type. Thus, more efficient processing can be performed as compared with bit-by-bit computation in Bit-wise TFHE.

Figure 6:
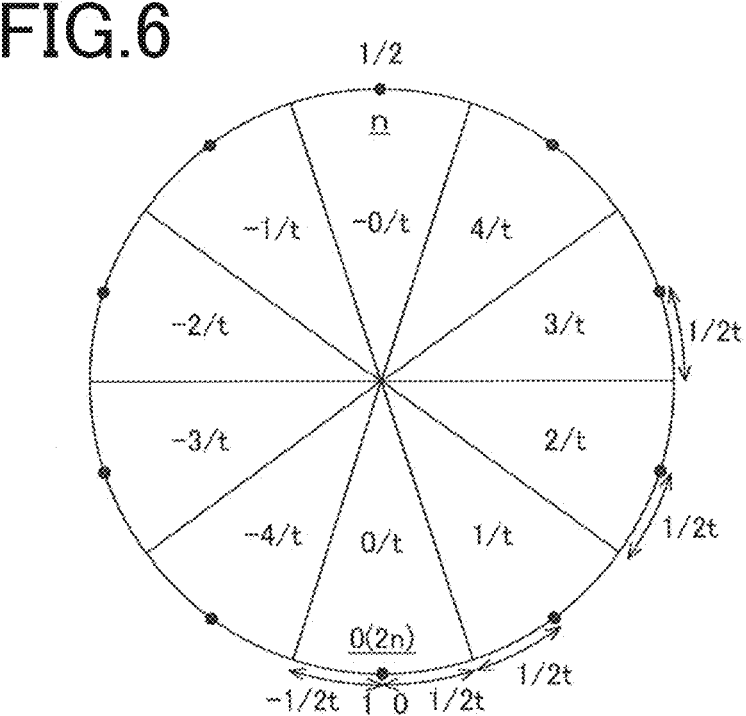
FIG. 6 is an explanatory diagram of TFHE applied to an Integer-wise type.

FIG. 6 is an explanatory diagram of TFHE applied to the Integer-wise type.

As illustrated in FIG. 6, the range from 0 to 1 associated with the circle group {T} is divided into t. For a TLWE ciphertext, possible values of a plaintext are t values obtained by dividing the range from 0 to 1, i.e., from $-(t/2)$ to $(t/2)-1$, and $(t/2)-1$ is the maximum value of the integer that can be recorded in one TLWE ciphertext.

As exemplified in FIG. 6, assuming that t is set to 10 and the range from 0 to 1 is divided into 10, a ciphertext can represent integers of $-5, -4, -3, -2, -1, 0, 1, 2, 3,$ and $4$.

In this case, these integer values are respectively assigned to sections obtained by dividing the range from 0 to 1 of the circle group {T} by t=10, i.e., sections of $-4/t, -3/t, -2/t, -1/t, -0/t, 4/t, 3/t, 2/t, 1/t,$ and $0/t$.

As illustrated in FIG. 5, 0 (1) on the circle group {T} is in a region from $-1/2t$ to $1/2t$. Regarding the plaintext of a ciphertext on the circle group {T}, the position in the region (the position on the circle group {T}) can be adjusted by adding or subtracting an offset based on, for example, $1/2t$ as necessary.

When the value of t is increased and the circle group {T} is divided more finely, the integer value that can be recorded in a TLWE ciphertext can be increased. However, too fine division of the circle group makes the range of an error to be added to the plaintext too small, causing an issue of decrease in the encryption strength. This point will be described later.

The following description is provided as to an example of an operation process using four arithmetic operations by Integer-wise type TFHE.

The encryption processing apparatus 1 of the present embodiment transforms the coordinates of an arbitrary point represented by orthogonal coordinates (a coordinate plane) using two variables (an x-coordinate value and a y-coordinate value) by Integer-wise type TFHE (TLWE ciphertexts) to polar coordinates (the distance from the origin and the declination angle). In the following description, transforming orthogonal coordinates to polar coordinates may be simply described as "polar coordinate transformation".

Transforming encrypted orthogonal coordinate values to encrypted polar coordinate values without decryption requires four arithmetic operations by Integer-wise type TFHE as described below.

The following description explains an operation method of polar coordinate transformation and a method of realizing four arithmetic operations by Integer-wise type TFHE.

Figure 7A:
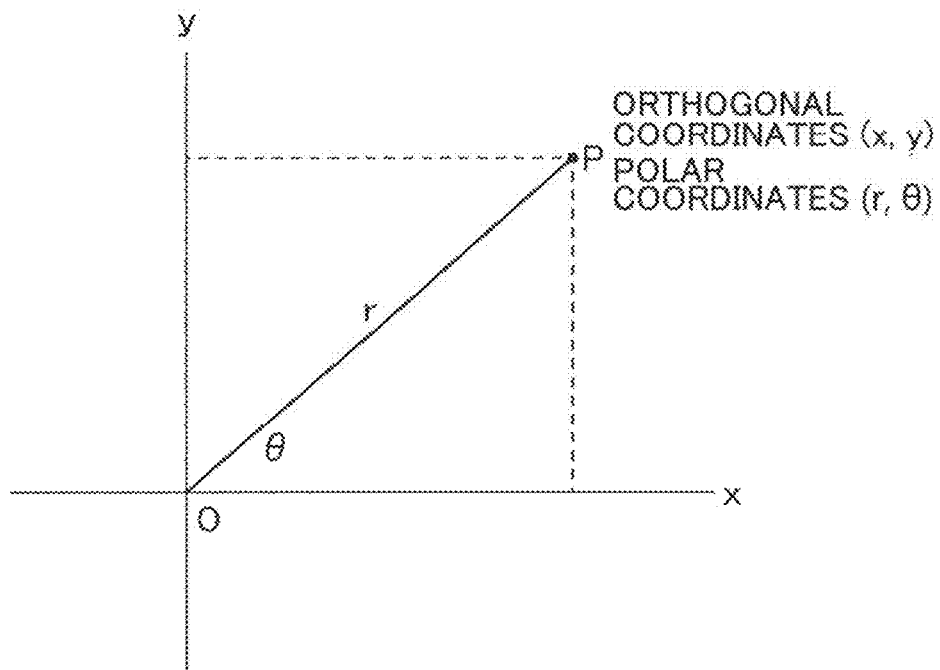
FIGS. 7A and 7B are explanatory diagrams of a position of a point on a plane.
Figure 7B:
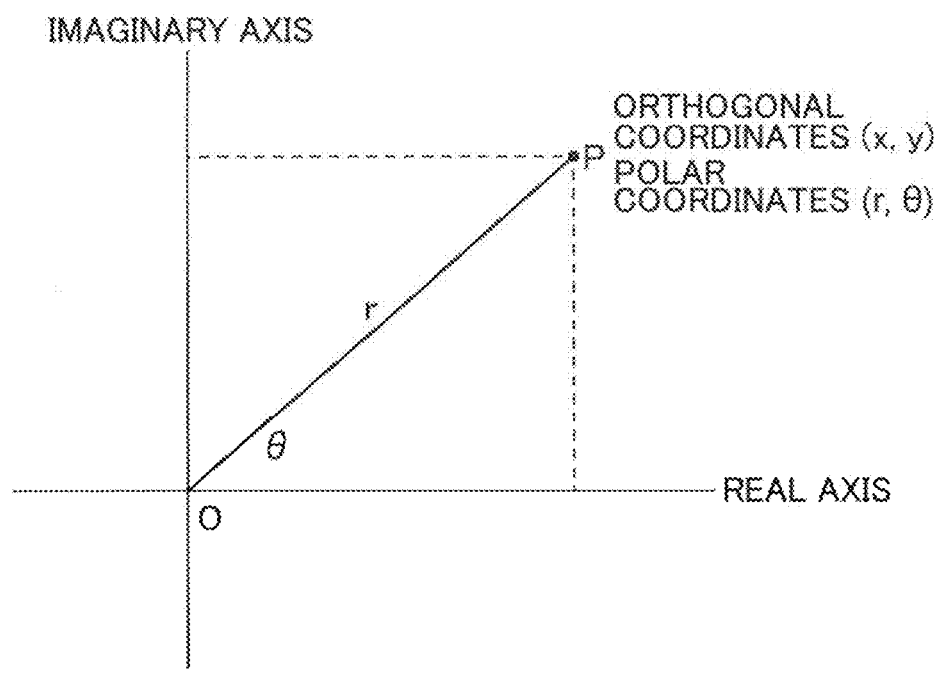

FIGS. 7A and 7B are explanatory diagrams of the position of a point on a plane.

The position of the point P can be represented by orthogonal coordinates or polar coordinates as illustrated in FIG. 7A.

The orthogonal coordinates represent the position of the point P on the plane by the x-coordinate value and the y-coordinate value in the form of (x, y). The polar coordinates represent the position of the point P by using the distance r from the origin O and the declination angle $\theta$ in the form of (r, $\theta$). The declination angle $\theta$ is an angle of rotation measured counterclockwise from a ray that passes through the origin O and is used as a reference (for example, the positive side of the x-axis).

The encryption processing apparatus 1 performs polar coordinate transformation by using four arithmetic operations by Integer-wise type TFHE. In particular, when the orthogonal coordinates (the x-coordinate value and the y-coordinate value) of the point P are encrypted by Integer-wise type TFHE, the encryption processing apparatus 1 transforms these coordinates to the polar coordinates while keeping them encrypted.

Similarly to the position of the point P on the plane, a complex number can be represented in the form of a real part+an imaginary part (x, y) on a complex plane (the Gaussian plane) or by polar coordinates (r, $\theta$) as illustrated in FIG. 7B. The method of polar coordinate transformation in the present embodiment can be applied to conversion of a complex number onto the complex plane.

In complex number calculation, a complex number is regarded as a point on the Gaussian plane, and multiplication between complex numbers is put into rotation and enlargement/reduction on the Gaussian plane. An operation can thus be sped up as already known.

It is very useful that the method of the present embodiment can convert a complex number in the form of a real part+an imaginary part to polar coordinates while keeping the complex number encrypted.

The following two operations are normally performed in order to transform orthogonal coordinates to polar coordinates.

(Operation 1) Calculate the distance r of the point P from the origin O.
(Operation 2) Calculate the arctangent (A TAN) from a ratio of the x-coordinate value and the y-coordinate value of the point P to obtain the declination angle $\theta$.

In the following description, a method is described in detail which performs (Operation 1) and (Operation 2)

described above for ciphertexts in order to transform orthogonal coordinates to polar coordinates while keeping them encrypted.

As is apparent from FIGS. 7A and 7B, $\sqrt{(x^2+y^2)}$ is calculated in order to calculate the distance r by (Operation 1). At this time, calculation of the square and calculation of the root are necessary. The encryption processing apparatus 1 performs the square calculation and the root calculation by an operation of a univariate function.

Further, when performing calculation for obtaining the ratio of the x-coordinate value and the y-coordinate value in (Operation 2), the encryption processing apparatus 1 swaps two variables (the x-coordinate value and the y-coordinate value) based on the magnitude relation therebetween. The encryption processing apparatus 1 limits the ratio of the two variables within a range from 0 to 1 to limit the declination angle θ within a range from 0° to 45° on a unit circle, and calculates the ratio of the two variables by the operation of the univariate function.

The univariate function is a function having two variables one of which is determined when the other is determined.

The univariate function of the present embodiment calculates the ratio of the two variables (the x-coordinate value and the y-coordinate value), in which when the x-coordinate value is determined, the y-coordinate value is determined, and vice versa.

When x=y (the ratio of the two variables is 1), the point P is located on a line segment T that is at an angle of 45° from the center (origin) O as the base on the unit circle, as also described below.

When x>y, the declination angle θ is located in a range of 45° between the x-axis and the line segment T on the unit circle.

When x<y, the declination angle θ is located in a range of 450 between the line segment T and the y-axis on the unit circle.

Assuming that the ratio of the two variables is a (0<a≤1), the two variables are represented as y=ax (y>x) or x=ay (y<x) based on the magnitude relation between x and y. The encryption processing apparatus 1 obtains the ratio a of the two variables by calculation of the univariate function.

In order to perform the operation of the univariate function for the x-coordinate value and the y-coordinate value that are encrypted, a method can be used which is obtained by extending Gate Bootstrapping in Chillotti et al., 2020. This method is described in "Bootstrapping in FHEW-like Cryptosystems, Daniele Micciancio and Yuriy Polyakov, Duality Technologies, Feb. 23, 2020". The method disclosed in this paper does not set a constant μ as coefficients of a test vector but sets a function result, thereby obtaining different results depending on the value of a TLWE ciphertext.

As illustrated in FIG. 6, the encryption processing apparatus 1 sets the number t by which the range from 0 to 1 of the circle group {T} is divided. In relation to calculation of the square of the x-coordinate value and the square of the y-coordinate value, t−1 is the maximum integer that can be recorded in one TLWE ciphertext as the x-coordinate value or the y-coordinate value, where t−1 is a resolution of the ratio of the x-coordinate value and the y-coordinate value and serves as an operation accuracy in polar coordinate transformation, and π/(2t) is a resolution of the declination angle θ.

Further, the encryption processing apparatus 1 sets a system parameter in TFHE.

Although the procedure is unchanged from that in the aforementioned paper, the degree n of a polynomial in TRLWE encryption (the polynomial F(X) as a test vector) is preferably a multiple of 2t. Further, the system parameter is set in such a manner that, in a ciphertext obtained after Gate Bootstrapping, the range of an error added to a plaintext is less than ±1/(16t).

A procedure of polar coordinate transformation is described by way of FIGS. 2 and 3.

It is assumed that there are a TLWE ciphertext cx of the x-coordinate value of the point P and a TLWE ciphertext cy of the y-coordinate value of the point P. The TLWE ciphertext cx and the TLWE ciphertext cy respectively correspond to the integer x of the x-coordinate value of the point P and the integer y of the y-coordinate value of the point P that both cannot be known without a private key.

The TLWE ciphertext cx has a real number x/(2t) as a plaintext.

The TLWE ciphertext cy has a real number y/(2t) as a plaintext.

[Calculation of Distance r from Origin O]

The encryption processing apparatus 1 (the first Bootstrapping unit 21) performs an operation that calculates the square of the integer x, which corresponds to (Operation 1). The encryption processing apparatus 1 performs the first Gate Bootstrapping using a test vector polynomial T1(X)

$$T1(X) = \sum_{i=0}^{t-1}\left(\frac{i^2}{2t}\right)\left(\sum_{j=0}^{n/t-1} X^{\frac{n}{t}i+j}\right)$$

on the TLWE ciphertext cx.

The encryption processing apparatus 1 (the first Bootstrapping unit 21) performs an operation that calculates the square of the integer y. The encryption processing apparatus 1 performs the second Gate Bootstrapping using the test vector polynomial T1(X)

$$T1(X) = \sum_{i=0}^{t-1}\left(\frac{i^2}{2t}\right)\left(\sum_{j=0}^{n/t-1} X^{\frac{n}{t}i+j}\right)$$

that is the same as that used in the first Gate bootstrapping, on the TLWE ciphertext cy.

To the test vector polynomial T1(X), the method of operating a univariate function described above is applied. In the test vector polynomial T1(X), the result of a function ($i^2$) that obtains the square of x or the square of y are set as coefficients.

The encryption processing apparatus 1 performs BlindRotate using the test vector polynomial T1(X) on the TLWE ciphertexts cx and cy as input of the first Gate Bootstrapping and input of the second Gate Bootstrapping, respectively, and further performs SampleExtract and KeySwitching. The encryption processing apparatus 1 thus obtains a TLWE ciphertext corresponding to $x^2$ and a TLWE ciphertext corresponding to $y^2$ at the same time.

That is, the encryption processing apparatus 1 performs Gate Bootstrapping using the test vector polynomial T1(X) and also performs an operation of a univariate function that obtains the TLWE ciphertext corresponding to $x^2$ and the TLWE ciphertext corresponding to $y^2$.

Next, the encryption processing apparatus 1 (the first operation unit 12) performs the first homomorphic operation between the ciphertext of $x^2$ and the ciphertext of $y^2$ respectively output by the first Gate Bootstrapping and the second Gate Bootstrapping, thereby obtaining a new TLWE ciphertext corresponding to $x^2+y^2$. The TLWE ciphertext obtained by the first operation unit 12 has $$\frac{x^2+y^2}{2t}$$

as a plaintext.

Next, the encryption processing apparatus 1 (the first Gate Bootstrapping unit 21) performs the third Gate Bootstrapping using a test vector polynomial T2(X)

$$T2(X) = \sum_{i=0}^{t-1}\left(\frac{\sqrt{i}}{2t}\right)\left(\sum_{j=0}^{n/t-1} X^{\frac{n}{t}i+j}\right)$$

on the TLWE ciphertext corresponding to $x^2+y^2$.

To the test vector polynomial T2(X), the method of operating a univariate function described above is applied. In the test vector polynomial T2(X), the result of a function (i) that obtains the square root of $x^2+y^2$ is set as coefficients. The square root of $x^2+y^2$ is the distance r of the point P from the origin O.

That is, the encryption processing apparatus 1 uses the ciphertext of $x^2+y^2$ as input of the third Gate Bootstrapping, performs BlindRotate using the test vector polynomial T2(X), and further performs SampleExtract and KeySwitching.

The encryption processing apparatus 1 thus obtains the TLWE ciphertext cr corresponding to $r=\sqrt{(x^2+y^2)}$ and having $\sqrt{(x^2+y^2)}/2t$ as a plaintext.

The encryption processing apparatus 1 performs the third Gate Bootstrapping using the test vector polynomial T2(X) and also performs an operation of a univariate function that obtains the TLWE ciphertext cr corresponding to $r=\sqrt{(x^2+y^2)}$ at the same time.

With the above processes, the ciphertext of the distance r is obtained in relation to (Operation 1).

[Calculation of Declination Angle θ]

The encryption processing apparatus 1 performs calculation in the following procedure in order to obtain the ratio d of the integer x and the integer y within a limited range from 0 to 1, which corresponds to (Operation 2).

The plaintexts of the integers x and y cannot be known unless the ciphertexts cx and cy are decrypted. Actually, the encryption processing apparatus 1 performs an operation by using the ciphertext cl of the value 1 that is the larger one of the integer x and the integer y and the ciphertext cs of the value s that is the smaller one of the integer x and the integer y, the operation corresponding to (the ciphertext cs÷the ciphertext cl) (division of cs by cl). The encryption processing apparatus 1 thus obtains the ciphertext cd.

The encryption processing apparatus 1 (the second operation unit 13) performs the second homomorphic operation cx−cy on the TLWE ciphertext cx and the TLWE ciphertext cy.

The encryption processing apparatus 1 (the second Bootstrapping unit 22) performs the fourth Gate Bootstrapping on the result of the second homomorphic operation and outputs the new TLWE ciphertext cc. The TLWE ciphertext cc is a ciphertext having 1/t or 0 (including an error) as a plaintext depending on whether cx−cy is positive or negative.

In the fourth Gate Bootstrapping, when SampleExtract and KeySwitching are performed as described in the aforementioned paper, 1/(2t) is obtained when x≥y (x−y is 0 or positive), and −1/(2t) is obtained when x<y (x−y is negative).

The encryption processing apparatus 1 adds a trivial ciphertext (0, 1/(2t)) to the result of Gate Bootstrapping, thereby obtaining the TLWE ciphertext cc corresponding to whether x−y is positive or negative.

The TLWE ciphertext cc has either of two values of 0 and 1/t as a plaintext. When x≥y (x−y is 0 or positive), the TLWE ciphertext cc has 1/t (symbol 1) as a plaintext. When x<y (x−y is negative), the TLWE ciphertext cc has 0 (symbol 0) as a plaintext.

The encryption processing apparatus 1 (the second operation unit 13) performs the third homomorphic operation ccx(cx−cy)+cy to obtain the TLWE ciphertext cl corresponding to the larger one of the x-coordinate value and the y-coordinate value.

The encryption processing apparatus 1 (the second operation unit 13) performs the fourth homomorphic operation ((0, 1/t)−cc)×(cx−cy)+cy to obtain the TLWE ciphertext cs corresponding to the smaller one of the x-coordinate value and the y-coordinate value.

Multiplication between the binary ciphertext cc and the integer ciphertext (cx−cy) can be performed by a separate process by a binary multiplication unit described below.

The TLWE ciphertext cs can also be obtained by cx+cy−cl.

The encryption processing apparatus 1 (the second operation unit 13) initializes the TLWE ciphertext cd and the variable i as represented by cd=(0, 1/(2t)) and i=1, where (0, 1/(2t)) is a trivial ciphertext having 1/(2t) as a plaintext. Here, 1/(2t) is an offset for setting the center of a slice obtained by dividing a circle group and may be different depending on implementation.

(1) The encryption processing apparatus 1 (the second operation unit 13) performs the fifth homomorphic operation cs−cl on the ciphertext cs and the ciphertext cl.

(2) The encryption processing apparatus 1 (the second Bootstrapping unit 22) performs the fifth Gate Bootstrapping on the result of the calculation by the second operation unit 13 to obtain a new ciphertext ct that is 1/t or 0 depending on whether cs−cl is positive or negative.

In the fifth Gate Bootstrapping, when SampleExtract and KeySwitching are performed as described in the aforementioned paper, 1/(2t) is obtained when s≥l (s−l is 0 or positive), and −1/(2t) is obtained when s<l (s−l is negative).

The encryption processing apparatus 1 adds the trivial ciphertext (0, 1/(2t)) to the result of Gate Bootstrapping, thereby obtaining the TLWE ciphertext ct corresponding to whether s−l is positive or negative.

The TLWE ciphertext ct has either of two values of 0 and 1/t as a plaintext. When s≥l (s−l is 0 or positive), the TLWE ciphertext ct has 1/t (symbol l) as a plaintext. When s<l (s−l is negative), the TLWE ciphertext ct has 0 (symbol 0) as a plaintext.

(3) The encryption processing apparatus 1 (the second operation unit 13) calculates cs=cs−ct×cl.

Multiplication (cl×ct) between the integer ciphertext cl and the binary ciphertext ct can be performed by a separate process by a binary multiplication unit described below.

(4) The encryption processing apparatus 1 (the second operation unit 13) calculates cd=cd×2+ct.

(5) The encryption processing apparatus 1 (the second operation unit 13) multiplies the ciphertext cs by 2 as a scalar multiple by an integer.

(6) The encryption processing apparatus 1 (the second operation unit 13) calculates i=i+1.

When the processes from (1) to (6) are repeated m=log_2 (t) times, values are stored in the ciphertext cd from the most significant bit in turn, so that the TLWE ciphertext cd corresponding to the ratio d of the x-coordinate value and the y-coordinate value is obtained.

Details are described below. The TLWE ciphertext ct has either of two values of 0 and 1/t as a plaintext. When cs>cl (cs−cl is 0 or positive), the TLWE ciphertext ct has 1/t (symbol 1) as a plaintext. When cs<cl (cs−cl is negative), the TLWE ciphertext ct has 0 (symbol 0) as a plaintext.

Multiplication between the integer ciphertext cl and the binary ciphertext ct can be performed by a binary operation unit in the method described below. As a result of ct×cl, the ciphertext cl is obtained as it is when the ciphertext ct is the symbol 1, and 0 is obtained when the ciphertext ct is the symbol 0.

Accordingly, as a result of calculation of the ciphertext ct in (2) based on cs−cl in (1) described above and calculation of cs=cs−ct×cl in (3), when cs≥cl (ct is the symbol 1), cs=cs−ct×cl (ct×cl continues to be subtracted from cs). In association with this subtraction, cd=cd×2+ct, so that the ciphertext cd is doubled, and lower bits are set in an appropriate manner.

The TLWE ciphertext cd obtained as a result of m=log_2 (t) repetitions of obtaining the new ciphertext ct, the new ciphertext cs, and the new ciphertext cd in the above-described manner has $$\frac{\lfloor t^s/l \rfloor}{2t}$$

as a plaintext, which corresponds to s/l that is a ratio of the smaller one of the x-coordinate value and the y-coordinate value to the larger one.

Regarding plaintexts, it is possible to obtain the number of repetitions when subtraction of a divisor from a dividend is repeated as much as possible, as a division result. However, regarding ciphertexts, since the result of subtraction is also encrypted, it is impossible to determine whether subtraction is no longer possible after subtraction of the divisor from the dividend is repeated, and it is also impossible to perform a branch process that stops subtraction when subtraction is no longer possible.

In the present embodiment, the binary TLWE ciphertext ct that determines whether cs−cl is positive or negative is output based on the result of the operation cs−cl, as described above.

As described above, while cs≥cl, the ciphertext ct is the symbol 1, and cl is subtracted from cs every time subtraction is repeated. When it becomes c<cl as a result of repetition of subtraction, the ciphertext cc becomes the symbol 0, and cl is no longer subtracted from cs every time subtraction is repeated. Since the value of the ciphertext ct cannot be known without being decrypted, it cannot be determined whether cs≥cl or cs<cl.

Meanwhile, the encryption processing apparatus 1 repeats the processes from (1) to (6) m=log_2(t) times. Although the maximum integer that can be recorded in one TLWE ciphertext is √t−1, the number of possible integers of a ciphertext is m=log_2(t), where m is a value that provides t when 2 is raised to the m power.

The encryption processing apparatus 1 adds the ciphertext ct to the ciphertext cd every time the ciphertext ct is obtained. As described above, while cs≥cl, the ciphertext ct is the symbol 1, and when cs<cl, the plaintext ct is the symbol 0.

Only the symbol 1 while cs>cl is added to the ciphertext cd, the symbol 0 is not added to the ciphertext cd substantially, and the ciphertext cd is doubled every time the calculation of cd=cd×2+ct is repeated. Therefore, by performing addition of ct log_2(t) times, the number of repetitions of subtraction of cl from cs while cs≥cl (the division result) is obtained.

According to this method, it is possible to perform division between ciphertexts only by repeating a predetermined process log 2(t) times, without performing determination whether subtraction cs−cl is possible, which cannot be known in an encrypted state, or performing a branch process.

The encryption processing apparatus 1 (the second Bootstrapping unit 22) performs the sixth Gate Bootstrapping using a test vector polynomial T3(X)

$$T3(X) = \sum_{i=0}^{t-1}\left(\left\lfloor \frac{t \times \tan^{-1}\frac{i}{l}}{8t} \right\rfloor\right)\left(\sum_{j=0}^{n/t-1} X^{\frac{n}{t}i+j}\right).$$

To the test vector polynomial T3(X), the method of operating a univariate function described above is applied. In the test vector polynomial T3(X), the result of a function (t×tan⁻¹(i/t)) that obtains the arctangent tan⁻¹y/x of the ratio d of the x-coordinate value and the y-coordinate value is set as coefficients.

The encryption processing apparatus 1 (the second Bootstrapping unit 22) uses the ciphertext cd as input of Gate Bootstrapping, performs BlindRotate using the test vector polynomial T3(X), and further performs SampleExtract and KeySwitching.

The encryption processing apparatus 1 can thus obtain the TLWE ciphertext cu corresponding to t×tan⁻¹(d) and having $$\frac{\left\lfloor t \times \tan^{-1}\left|\frac{s}{l}\right|/2 \right\rfloor}{8t}$$

as a plaintext.

The encryption processing apparatus 1 performs the Gate Bootstrapping using the test vector polynomial T3(X) and also performs an operation of a univariate function that obtains the TLWE ciphertext cu corresponding to t×tan⁻¹(i/t) at the same time.

Figure 8A:
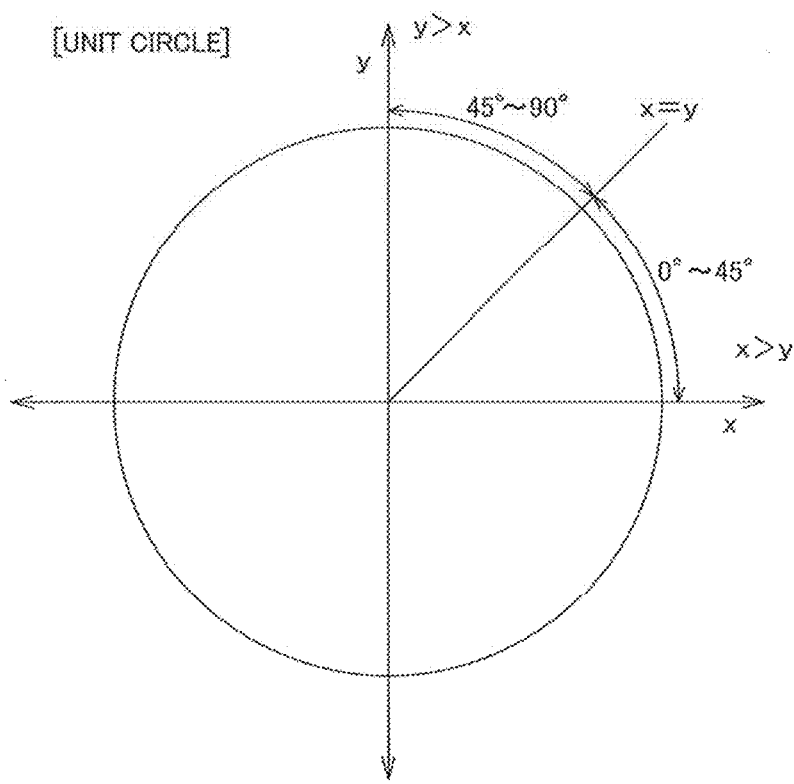
FIGS. 8A and 8B are diagrams illustrating the correspondence between a unit circle and a circle group.
Figure 8B:
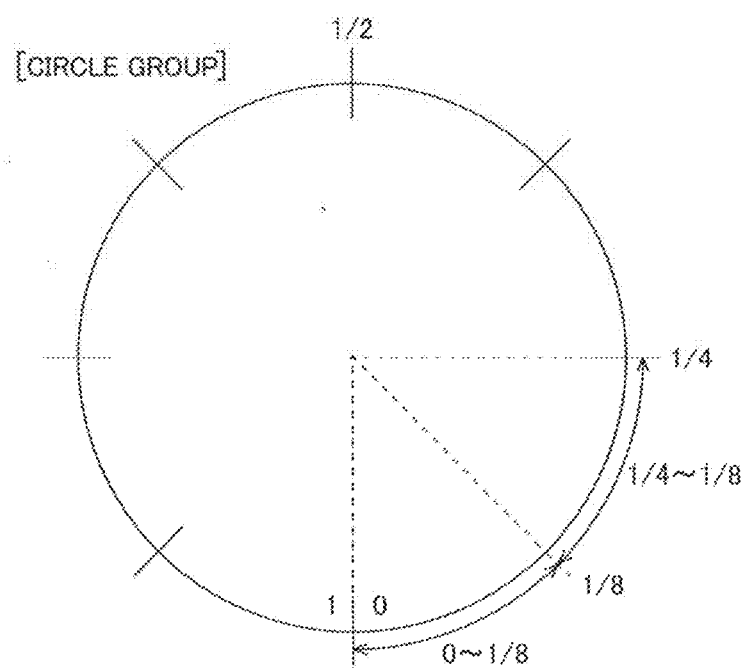

FIGS. 8A and 8B are diagrams illustrating the correspondence between a unit circle and a circle group. FIG. 8A illustrates the unit circle, and FIG. 8B illustrates the circle group.

When x>y, the TLWE ciphertext cu corresponds to the result of mapping of a rotation angle (declination angle) of a point (a, b) on the unit circle from the x-axis in the counterclockwise direction from 0° to 45° onto sections from 0 to 1/8 of the circle group {T}.

When x<y, the TLWE ciphertext cu corresponds to the result of mapping of a rotation angle (declination angle) of the point (a, b) on the unit circle from the y-axis in the clockwise direction from 0° to 45° onto sections from 1/4 to 1/8 of the circle group {T}.

It is shown by the ciphertext cc whether x<y or x>y, i.e., whether x−y is positive or negative. The encryption processing apparatus 1 (the second operation unit 13) performs the sixth homomorphic operation $c\theta=(0, 1/4)-cu+cc\times(2cu-(0, 1/4))$ on the TLWE ciphertext cu and the TLWE ciphertext cc.

The TLWE ciphertext $c\theta$ is a ciphertext of the rotation angle (declination angle) $\theta$ when the rotation angle from 0° to 360° is associated with the range from 0 to 1 of the circle group $\{T\}$. By preforming the sixth homomorphic operation, the ciphertext $c\theta$ of the rotation angle (declination angle) $\theta$ can be obtained.

With the above processes, the ciphertext of the distance r from the origin and the ciphertext of the declination angle $\theta$ are obtained with regard to the point P on the coordinate plane represented by orthogonal coordinates. That is, the orthogonal coordinates can be transformed to polar coordinates while being encrypted.

In the above description, the method of transforming orthogonal coordinates represented by the x-coordinate value and the y-coordinate value to polar coordinates has been described. A complex number can be converted to a point on the Gaussian plane by performing identical processes with the real part and the imaginary part of the complex number assumed as the TLWE ciphertext cx and the TLWE ciphertext cy, respectively.

In the present embodiment, TFHE can be used as homomorphic encryption that can be subjected to four arithmetic operations in the Integer-wise type, not in the Bit-wise type, so that more efficient processing can be performed as compared with bit-by-bit computation.

In addition, in complex number calculation, a complex number is regarded as a point on the Gaussian plane, and multiplication between complex numbers is put into rotation and enlargement/reduction on the Gaussian plane. It is thus expected that an operation can be sped up.

Figure 9:
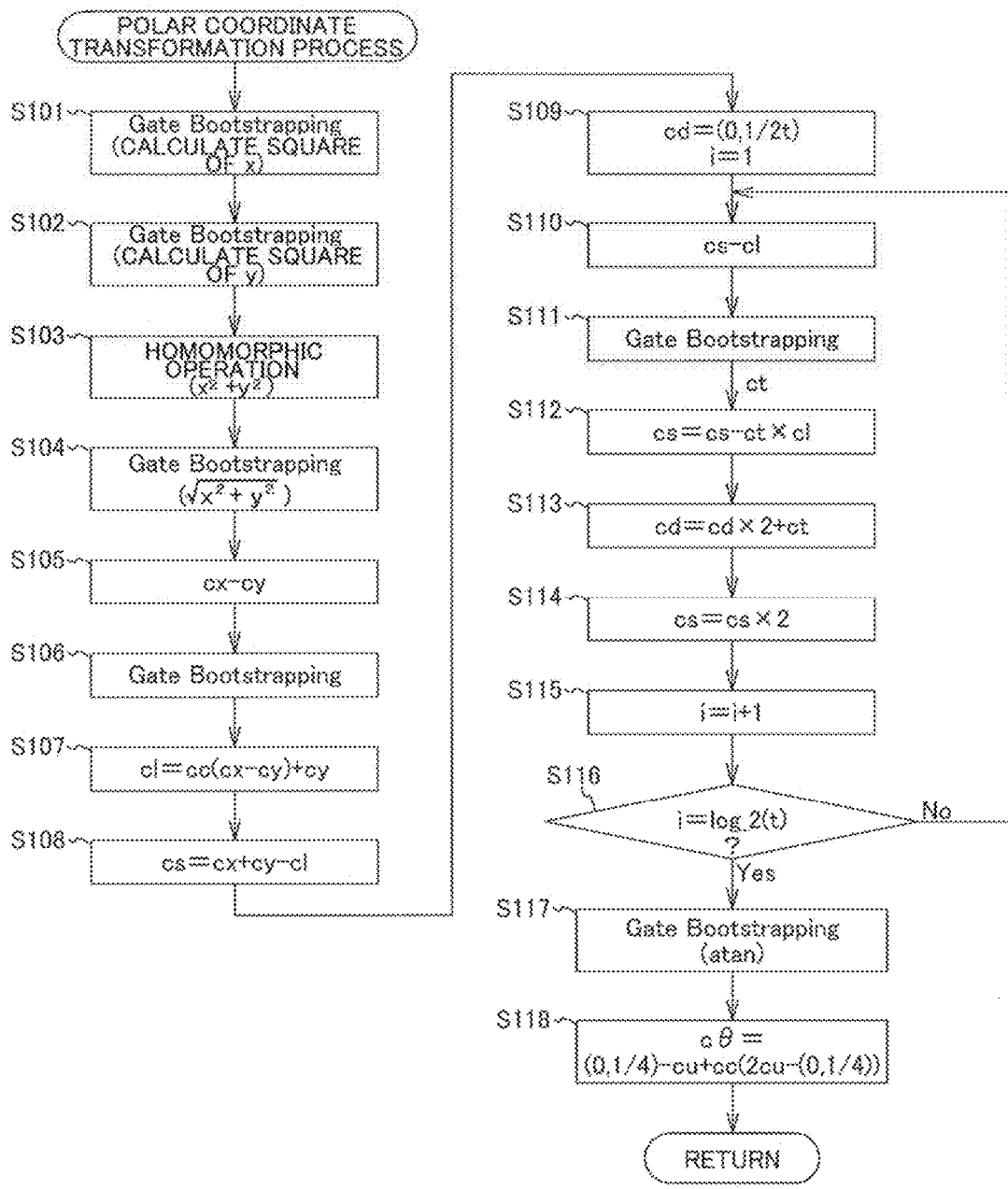
FIG. 9 is a flowchart for explaining a polar coordinate transformation process in the present embodiment.

FIG. 9 is a flowchart for explaining a polar coordinate transformation process in the present embodiment.

At Step S101, the encryption processing apparatus 1 (the first Bootstrapping unit 21) performs the first Gate Bootstrapping on the TLWE ciphertext cx of the integer x that is the x-coordinate value as input.

At Step S102, the encryption processing apparatus 1 (the first Bootstrapping unit 21) performs the second Gate Bootstrapping on the TLWE ciphertext cy of the integer y that is the y-coordinate value as input.

At Step S103, the encryption processing apparatus 1 (the first operation unit 12) performs the first homomorphic operation corresponding to $x^2+y^2$ on the TLWE ciphertexts respectively obtained by Gate Bootstrapping at Steps S101 and S102.

At Step S104, the encryption processing apparatus 1 (the first Bootstrapping unit 21) performs the third Gate Bootstrapping on the ciphertext obtained at Step S103 to obtain the ciphertext cr of $r=\sqrt{(x^2+y^2)}$.

At Step S105, the encryption processing apparatus 1 (the second operation unit 13) performs the second homomorphic operation cx−cy.

At Step S106, the encryption processing apparatus 1 (the Bootstrapping unit 22) performs Gate Bootstrapping on the TLWE ciphertext cl as input to obtain the TLWE ciphertext cc.

At Step S107, the encryption processing apparatus 1 (the second operation unit 13) performs the third homomorphic operation $ccx(cx-cy)+cy$ to obtain the TLWE ciphertext cl.

At Step S108, the encryption processing apparatus 1 (the second operation unit 13) performs the fourth homomorphic operation $(0, 1/(2t))-cc\times(cx-cy)+cy$ or $cx+cy-cl$ to obtain the TLWE ciphertext cs.

At Step S109, the encryption processing apparatus 1 sets an initial value of the TLWE ciphertext cd to a trivial ciphertext $(0, 1/(2t))$ having $1/(2t)$ as a plaintext, and substitutes 1 into the variable i, thereby initializing.

The encryption processing apparatus 1 performs a division process on the TLWE ciphertext cs as a dividend and the TLWE ciphertext cl as a divisor by loop processing from Steps S110 to S116.

First, the encryption processing apparatus 1 (the second operation unit 13) performs a homomorphic operation cs−cl at Step S110.

At Step S111, the encryption processing apparatus 1 (the second Bootstrapping unit 22) performs the fifth Gate Bootstrapping on the result of the operation at Step S110 as input to obtain the new ciphertext ct.

At Step S112, the encryption processing apparatus 1 (the second operation unit 13) performs a homomorphic operation $cs=cs-ct\times cl$.

At Step S113, the encryption processing apparatus 1 (the second operation unit 13) performs a homomorphic operation $cd=cd\times 2+ct$.

At Step S114, the encryption processing apparatus 1 (the second operation unit 13) performs a homomorphic operation $cs=cs\times 2$.

At Step S115, the encryption processing apparatus 1 increments the variable i by 1.

At Step S116, the encryption processing apparatus 1 determines whether the value of the variable i has reached log_2(t).

When determining that the value of the variable i has reached log_2(t) (Yes at Step S116), the encryption processing apparatus 1 outputs the TLWE ciphertext cd at that time as a division result.

At Step S117, the encryption processing apparatus 1 performs the sixth Gate Bootstrapping on the TLWE ciphertext cd as input to obtain the new TLWE ciphertext cu.

At Step S118, the encryption processing apparatus 1 performs a homomorphic operation $((0, 1/4)-cu+cc\times(2cu-(0, 1/4)))$ to obtain the TLWE ciphertext $c\theta$ of the declination angle $\theta$.

With the above processes, the ciphertext cr of the distance r of the point P from the origin and the ciphertext $c\theta$ of the declination angle $\theta$ of the point P are obtained. That is, the orthogonal coordinates (x, y) of the point P can be transformed to the polar coordinates (r, $\theta$).

[Multiplication Between Integer Ciphertext and Binary Ciphertext (Binary Multiplication)]

Multiplication between the integer ciphertext cy and the binary ciphertext cc by a binary multiplication unit can be performed in the following manner, for example.

In the present embodiment, the range from 0 to 1 associated with the circle group $\{T\}$ is divided into t portions as illustrated in FIG. 5, and the ciphertext cy is a ciphertext of 0 to (t/2)−1.

In the above description, the ciphertext cc has been described as being the binary symbol 1 when the plaintext is 1/t and the binary symbol 0 when the plaintext is 0.

A ciphertext cc' with the symbol reversed can be obtained by multiplication of the ciphertext cc by t/2 and addition of a trivial ciphertext (0, 1/2). Obtaining the ciphertext cc' is not necessarily required, although particularly described for explanation. Binary multiplication can also be performed on the ciphertext cc as it is. The ciphertext cc' and the ciphertext cc are synonymous ciphertexts in terms of being able to take two values corresponding to the symbols 0 and 1.

Regarding the ciphertext cc, in a case where the plaintext is 1/t, when the plaintext is multiplied by t/2, and (0, 1/2) is added to the ciphertext cc, the plaintext becomes 1 (0) as represented by (1/t)×(t/2)+1/2=1/2+1/2=1 (0).

In a case where the plaintext is 0, when the plaintext is multiplied by t/2, and (0, 1/2) is added to the ciphertext cc, the plaintext becomes 1/2 as represented by $$0 \times (t/2) + 1/2 = 0 + 1/2 = 1/2.$$

The ciphertext cc' thus obtained becomes the symbol 1 when the plaintext is 0 and becomes the symbol 0 when the plaintext is 1/2.

The following description is made by associating the ciphertext cc' with a ciphertext having the integer 0 or the integer t/2 as a plaintext, where t is an even number.

The plaintext 0 of the ciphertext cc' obtained as described above is associated with the integer 0, and the plaintext 1/2 of the ciphertext cc' is associated with the integer t/2 described below.

The ciphertext cc is described as the ciphertext cc' that is the binary symbol 1 when the plaintext is the integer 0 and the binary symbol 0 when the plaintext is the integer t/2.

Two univariate functions $F_{id}$ and $F_{half}$ are used as elements of Gate Bootstrapping in order to perform multiplication between the integer ciphertext cy and the binary ciphertext cc'.

In order to perform an operation of a univariate function for an encrypted integer value, a method can be used which is obtained by expanding Gate Bootstrapping in Chillotti et al., 2020. This method is described in "Bootstrapping in FHEW-like Cryptosystems, Daniele Micciancio and Yuriy Polyakov, Duality Technologies, Feb. 23, 2020". The method in this paper does not set a constant μ as coefficients of a test vector but sets a function result, thereby obtaining different results depending on the value of a TLWE ciphertext.

The univariate function Fid outputs, for the ciphertext cy of the integer 0 to (t/2)−1 input thereto, a ciphertext of the same integer 0 to (t/2)−1.

In a test vector $T_{id}(X)$ for executing a univariate function $f_{id}$ simultaneously with BlindRotate, $$\begin{cases} \mu_0, \ldots, \mu_{\lfloor \frac{n}{t} \rfloor} := \frac{f_{id}(0)}{t} = 0, \\ \mu_{\lfloor \frac{(2i-1)n}{t} \rfloor + 1}, \ldots, \mu_{\lfloor \frac{(2i+1)n}{t} \rfloor} := \frac{f_{id}(i)}{t} = \frac{i}{t}, \text{ for } i = 1, \ldots, t/2 - 1, \\ \mu_{n - \lfloor \frac{n}{t} \rfloor}, \ldots, \mu_{n-1} := \frac{-f_{id}(0)}{t} = 0. \end{cases}$$

are set as coefficients of respective orders from 0-th order to (n−1)th order.

The univariate function fhalf is a function that provides, for the ciphertext cy of the integer 0 to (t/2)−1 input thereto, cy/2 when the plaintext integer is an even number and −(cy+1)/2−((t/2)−1)/2 otherwise.

In a test vector $T_{half}(X)$ for executing the univariate function $f_{half}$ simultaneously with BlindRotate, $$\begin{cases} \mu_0, \ldots, \mu_{\lfloor \frac{n}{t} \rfloor} := \frac{f_{half}(0)}{t} = 0, \\ \mu_{\lfloor \frac{(2i-1)n}{t} \rfloor + 1}, \ldots, \mu_{\lfloor \frac{(2i+1)n}{t} \rfloor} := \frac{f_{half}(i)}{t} = \frac{i}{t}, \text{ for } i = 1, \ldots, t/2 - 1, \\ \mu_{n - \lfloor \frac{n}{t} \rfloor}, \ldots, \mu_{n-1} := \frac{-f_{half}(0)}{t} = 0. \end{cases}$$

are set as coefficients of respective orders from 0-th order to (n−1)th order.

First, the encryption processing apparatus 1 performs a homomorphic operation between the TLWE ciphertext cc' that is a binary ciphertext and the TLWE ciphertext cy that is an integer ciphertext.

The encryption processing apparatus 1 performs Gate Bootstrapping on the result of the homomorphic operation as input by using the above test vector polynomial $T_{id}(X)$ to obtain a temporary ciphertext $c_{tmp}$.

When the TLWE ciphertext cc' is a ciphertext of t/2 (corresponding to the plaintext 0 of the ciphertext cc, symbol 0), the result of cc'+cy is a ciphertext of y/t+1/2, and the plaintext of the TLWE ciphertext cy is rotated to a position symmetrical with respect to the origin. The plaintext of the ciphertext $c_{tmp}$ after Gate Bootstrapping using the test vector polynomial $T_{id}(X)$ is moved to a bilaterally symmetrical position. The ciphertext $c_{tmp}$ is a ciphertext obtained by reversing the sign of the ciphertext cy.

When the TLWE ciphertext cc' is a ciphertext of 0 (corresponding to the plaintext 1/t of the ciphertext cc, symbol 1), the result of cc'+cy is a ciphertext of y/t, and the plaintext of the ciphertext $c_{tmp}$ after Bootstrapping remains the same as a plaintext of the ciphertext cy.

The encryption processing apparatus 1 then performs a homomorphic operation (the ciphertext cy+the ciphertext $c_{tmp}$).

When the TLWE ciphertext cc' is the ciphertext of 0 (symbol 1), the result of the homomorphic operation (the ciphertext cy+the ciphertext $c_{tmp}$) is the ciphertext cy+the ciphertext cy.

When the TLWE ciphertext cc' is the ciphertext of t/2 (symbol 0), the result of the homomorphic operation (the ciphertext cy+the ciphertext $c_{tmp}$) is the ciphertext $c_0$ having 0 as a plaintext.

The encryption processing apparatus 1 performs Gate Bootstrapping on the result of the homomorphic addition as input by using the above test vector polynomial $T_{half}(X)$. As a result of Gate Bootstrapping, the ciphertext cy+the ciphertext cy is converted to the ciphertext cy, and the ciphertext $c_0$ remains the ciphertext $c_0$.

When the TLWE ciphertext cc' by which the integer ciphertext cy is multiplied is the ciphertext of 0, the ciphertext cy is obtained by Gate Bootstrapping. When the TLWE ciphertext cc' is the ciphertext of t/2, the ciphertext $c_0$ is obtained.

By performing the processes described above, the encryption processing apparatus 1 can perform multiplication between the integer ciphertext cy and the binary ciphertext cc'.

Since a value on a circle group which is used by the ciphertext cc is different as described above, adjustment needs to be performed by multiplication of the value obtained by Gate Bootstrapping by 2t. Since 2t is an integer, multiplication is defined on the circle group.

The encryption processing apparatus 1 can perform multiplication between cx−cy or 2cu and the binary ciphertext cc in place of the integer ciphertext cy.

The encryption processing apparatus 1 can perform multiplication between the integer ciphertext cl and the binary ciphertext ct in an identical manner to the above-described multiplication between the integer ciphertext cy and the binary ciphertext cc.

Figure 10A:
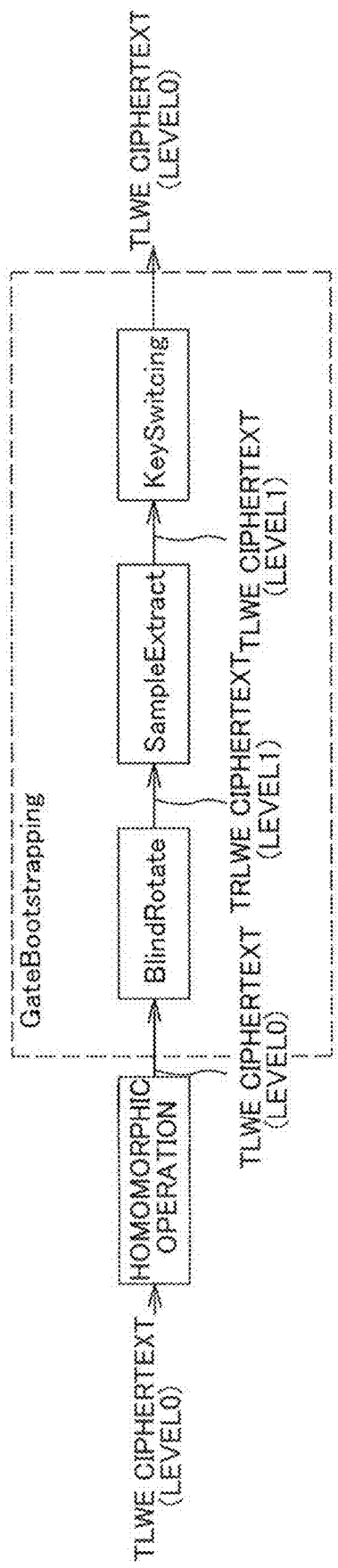
FIGS. 10A and 10B are diagrams illustrating ciphertexts input to and output from Gate Bootstrapping in the present embodiment.
Figure 10B:
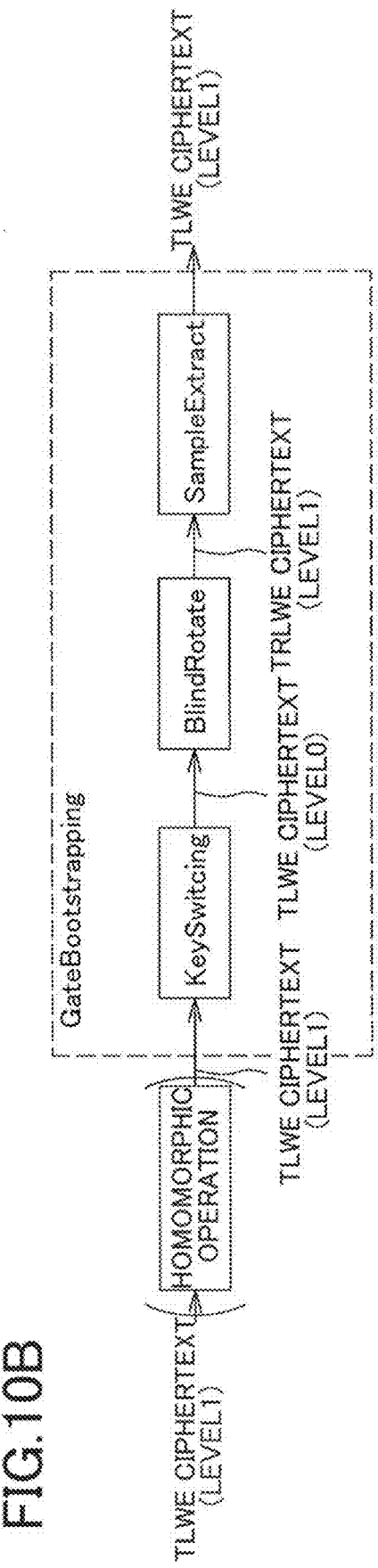

FIGS. 10A and 10B are diagrams illustrating ciphertexts input to and output from Gate Bootstrapping in the present embodiment.

In the above description, Gate Bootstrapping has been described as being performed in the order of BlindRotate, SampleExtract, and KeySwitching as illustrated in FIG. 10A.

The order is not limited thereto. First, KeySwitching can be performed in Gate Bootstrapping, as illustrated in FIG. 10B, and thereafter BlindRotate and SampleExtract can be performed.

As for TLWE ciphertexts, there is a concept of levels depending on the security strengths.

In Gate Bootstrapping in FIG. 10A, TLWE ciphertexts as input and output are at LEVEL0. BlindRotate is performed for the LEVEL0 TLWE ciphertext, and a TLWE ciphertext obtained by SampleExtract for a TRLWE ciphertext that is the output of BlindRotate becomes a LEVEL1 ciphertext. However, as a result of KeySwitching, a LEVEL0 TLWE ciphertext is output.

Meanwhile, in the method illustrated in FIG. 10B, TLWE ciphertexts as input and output of the Gate Bootstrapping are set to LEVEL1, and KeySwitching is performed first to lower the level to LEVEL0. In this state, BlindRotate is performed. When SampleExtract is then performed for the TRLWE ciphertext as the output of BlindRotate, a LEVEL1 TLWE ciphertext is output.

In FIGS. 10A and 10B, Gate Bootstrapping is performed on the result of a homomorphic operation performed on a TLWE ciphertext as input. Meanwhile, in the present embodiment, Gate Bootstrapping may be performed directly on the TLWE ciphertext as input, as described in FIG. 2. In this case, the homomorphic operation before Gate Bootstrapping is not necessarily required.

The LEVEL0 ciphertext is formed by an N-th order vector [a] of elements on the circle group $\{T\}$ encrypted with an N-th order private key [s]. Meanwhile, the LEVEL1 ciphertext obtained as a result of SampleExtract is formed by an n-th order vector [a'] of elements on the circle group $\{T\}$ encrypted with an n-th order private key [s'].

Since the LEVEL0 ciphertext is less than the LEVEL1 ciphertext in the number of coefficients that determine the difficulty of the LWE problem (the order of the vector), the amount of computation of homomorphic addition is less than that at LEVEL1.

Meanwhile, the LEVEL0 ciphertext has a problem that its security strength tends to be lowered when an acceptable error added to the plaintext is made smaller. This is because in LWE encryption, the safety is guaranteed by the error added to the plaintext.

As for TLWE encryption, as the error added the plaintext becomes larger and the number of the coefficients (the order of the vector) is larger, computation (decryption) is more difficult.

In other words, as for TLWE encryption, as the error added to the plaintext is smaller and the number of coefficients (the order of the vector) is smaller, computation (decryption) is easier.

In particular, in TFHE applied to the Integer-wise type, it is necessary to divide the range from 0 to 1 of the circle group $\{T\}$ more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure the security by increasing the number of coefficients (the order of the vector) in the ciphertext.

In order to ensure the security of the ciphertext that is easy to calculate (decipher) by reducing the error added to the plaintext, it is desirable to move KeySwitching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by KeySwitching as input.

Further, making an error to be added to a plaintext smaller has a problem of an error in decryption in addition to the above-described problem of security strength.

As described above, in TFHE applied to Integer-wise type, the range from 0 to 1 associated with the circle group $\{T\}$ is divided into t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a apparatus to which the present embodiment is applied.

[Application Example]

The processing performed by the encryption processing apparatus 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing apparatus 1 is a database sever that manages the encrypted database, receives a query encrypted by TLWE encryption from a terminal apparatus connected thereto via a network or the like, and returns a response to the query which is encrypted by TLWE encryption to the terminal apparatus.

Since an index cannot be created in the encrypted database, it is necessary to perform comparison and aggregation for the entire database.

The encryption processing apparatus 1 performs a comparison operation that compares all the records of the encrypted database with the query by functions of the first operation unit 12, the second operation unit 13, the first Bootstrapping unit 21, and the second Bootstrapping unit 22.

The comparison operation is to perform subtraction between a ciphertext of a record and a ciphertext of a query, and the sign of the subtraction result is equivalent to the comparison operation.

The encryption processing apparatus 1 can further perform an aggregate operation for records that match the query in the comparison operation.

In the aggregate operation, the encryption processing apparatus 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts. In addition, it is considered that a full adder operation is frequently used when Bit-wise ciphertexts are used. If the bit length of an integer to be handled becomes large, the number of required full adders also increases. The four arithmetic operations are homomorphic four arithmetic operations with respect to encrypted numerical values that are regarded as ciphertexts of respective bits when a permutation using an input ciphertext is expressed in binary.

The encryption processing apparatus 1 of the present embodiment performs four arithmetic operations and comparison between Integer-wise ciphertexts each having an integer as its plaintext, instead of performing four arithmetic operations on a bit-by-bit basis on Bit-wise ciphertexts by using a full adder. A query execution time can thus be reduced significantly.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption.

In addition, the Euclidean distance is often used for comparison in fuzzy authentication and fuzzy search. When the Euclidean distance is calculated, calculation of a square is required. Therefore, in Bit-wise type homomorphic encryption, $O(N^2)$ full adders must be caused to operate with respect to the bit length of data when multiplication is performed. Even in a comparison operation by simple subtraction, it is necessary to operate $O(N)$ full adders. The encryption processing apparatus 1 of the present embodiment performs four arithmetic operations and comparison between Integer-wise ciphertexts each having an integer as its plaintext, instead of performing four arithmetic operations on a bit-by-bit basis on Bit-wise ciphertexts by using a full adder. A processing time required for fuzzy authentication or fuzzy search can thus be reduced largely.

Figure 11:
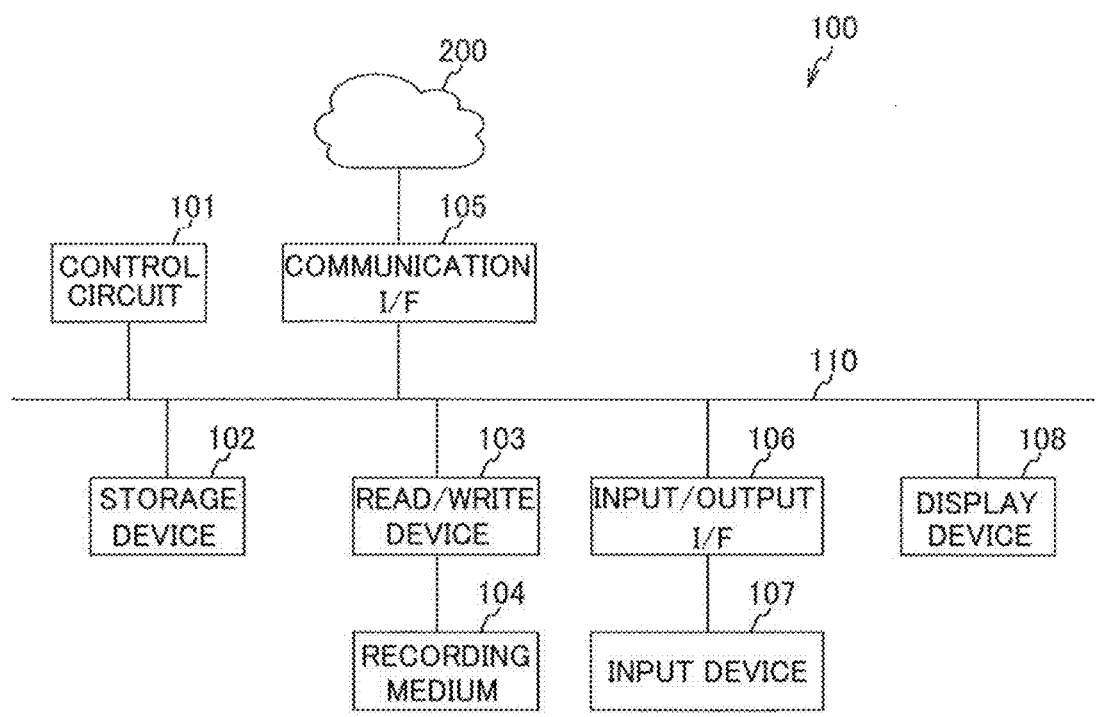
FIG. 11 is a block diagram illustrating an example of a computer apparatus.

FIG. 11 is a block diagram illustrating an example of a computer apparatus.

A configuration of a computer apparatus 100 is described with reference to FIG. 11.

The computer apparatus 100 is, for example, an encryption processing apparatus that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing apparatus 1 can be configured by selecting a part of or all elements from the constituent elements incorporated in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores various types of data therein. For example, the storage device 102 is a memory such as a Read Only Memory (ROM) and a Random Access Memory (RAM), or a non-transitory computer-readable recording medium such as a Hard Disk (HD) and a Solid State Drive (SSD). The storage device 102 may store therein an information processing program that causes the control circuit 101 to function as the controller 10 in FIG. 1. The storage device 102 functions as the storage unit 20 in FIG. 1, for example. The information processing program is a program for making a processor perform a process of encrypting a ciphertext, for example.

The encryption processing apparatus 1 loads a program stored in the storage device 102 into a RAM when performing information processing.

The encryption processing apparatus 1 executes the program loaded to the RAM by the control circuit 101, thereby performing processing that includes at least one of a receiving process, the first operation process, the second operation process, the first Bootstrapping process, the second Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-transitory computer-readable recording medium such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer apparatus 100 and other apparatuses to one another via the network 200 in a communicable manner. The communication interface 105 functions as the communication unit 25 in FIG. 1, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer apparatus 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer apparatus 100 to other apparatuses.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing method, executed by a processor,
    the encryption processing method comprising:
    performing a homomorphic operation involved in a predetermined operation on a first ciphertext, wherein the first ciphertext is a fully homomorphic ciphertext that has, as a plaintext associated with an integer, a value obtained by adding an error with a predetermined variance to a predetermined value and that is able to be subjected to a predetermined operation between integers without being decrypted; and
    applying a predetermined polynomial to the first ciphertext to obtain a first new ciphertext,
    wherein the predetermined operation is an operation for transforming coordinates of a point on a plane from orthogonal coordinates to polar coordinates,
    wherein the predetermined operation is performed to perform fuzzy authentication using the first ciphertext input thereto,
    wherein the fuzzy authentication is performed based on a correspondence between first biometric authentication data that is presented in an authentication request and second biometric authentication data that is registered in an encrypted database, and
    wherein the fuzzy authentication determines whether the first biometric authentication data and the second biometric authentication data match within a threshold, and
    wherein the encryption processing method further comprises:
    applying a first polynomial to the first ciphertext corresponding to an x-coordinate value of the point to obtain the first new ciphertext corresponding to a square of the x-coordinate value,
    applying a second polynomial to a second ciphertext corresponding to a y-coordinate value of the point to obtain a second new ciphertext corresponding to a square of the y-coordinate value, and
    applying a predetermined polynomial to a third ciphertext obtained by a homomorphic operation between the first new ciphertext corresponding to the square of the x-coordinate value and the second new ciphertext corresponding to the square of the y-coordinate value, to obtain a fourth ciphertext corresponding to a distance of the point from an origin.

2. An encryption processing apparatus that processes a ciphertext by performing the encryption processing method according to claim 1.

3. The encryption processing apparatus according to claim 2, wherein the processor performs a process of reducing number of coefficients of a ciphertext, prior to obtaining a new ciphertext by using a ciphertext with increased coefficients as input and a predetermined polynomial.

4. The encryption processing apparatus according to claim 2, wherein the processor performs the predetermined operation to perform a process involved in a fuzzy search using the first ciphertext input thereto.

5. The encryption processing apparatus according to claim 2, wherein the processor performs the predetermined operation to process a query based on the first ciphertext input thereto to an encrypted database.

6. A non-transitory computer-readable recording medium storing a program for causing the processor to perform the encryption processing method according to claim 1.

7. An encryption processing method, executed by a processor, the encryption processing method comprising:
performing a homomorphic operation involved in a predetermined operation on a first ciphertext, wherein the first ciphertext is a fully homomorphic ciphertext that has, as a plaintext associated with an integer, a value obtained by adding an error with a predetermined variance to a predetermined value and that is able to be subjected to a predetermined operation between integers without being decrypted; and
applying a predetermined polynomial to the first ciphertext to obtain a first new ciphertext,
wherein the predetermined operation is an operation for transforming coordinates of a point on a plane from orthogonal coordinates to polar coordinates,
wherein the predetermined operation is performed to perform fuzzy authentication using the first ciphertext input thereto,
wherein the fuzzy authentication is performed based on a correspondence between first biometric authentication data that is presented in an authentication request and second biometric authentication data that is registered in an encrypted database, and
wherein the fuzzy authentication determines whether the first biometric authentication data and the second biometric authentication data match within a threshold, and wherein the encryption processing method further comprises:
obtaining, based on the first ciphertext obtained by applying a predetermined polynomial to the first new ciphertext obtained by a homomorphic operation between a second ciphertext corresponding to an x-coordinate value of the point and a third ciphertext corresponding to a y-coordinate value of the point, the second ciphertext, and the third ciphertext, a fourth ciphertext corresponding to a larger one of the x-coordinate value and the y-coordinate value and a fifth ciphertext corresponding to a smaller one of the x-coordinate value and the y-coordinate value,
obtaining, based on a subtraction result of homomorphic subtraction of the fifth ciphertext from the fourth ciphertext, a binary sixth ciphertext that determines whether the subtraction result is positive or negative,
performing a subtraction process of subtracting a seventh ciphertext of a result of homomorphic multiplication between the fifth ciphertext and the binary sixth ciphertext from the fourth ciphertext in a homomorphic manner, the fourth ciphertext and the ciphertext of the result of the homomorphic multiplication serving as one ciphertext and another ciphertext, respectively,
obtaining a new value of the binary sixth ciphertext by using a subtraction result of the subtraction process as a new value of the fourth ciphertext,
repeating the subtraction process using the new value of the fourth ciphertext, the fifth ciphertext, and the new value of the binary sixth ciphertext, and
repeating addition of the binary sixth ciphertext to an initial value the same number of times as the number of repetitions of the subtraction process to obtain an eighth ciphertext corresponding to a ratio of the x-coordinate value and the y-coordinate value, and applying a predetermined polynomial to the eighth ciphertext corresponding to the ratio to obtain a new ciphertext corresponding to a declination angle of the point.

8. An encryption processing apparatus that processes the first ciphertext by performing the encryption processing method according to claim 7,
the first ciphertext being a fully homomorphic ciphertext that has, as a plaintext associated with an integer, a value obtained by adding an error with a predetermined variance to a predetermined value and that is able to be subjected to a predetermined operation between integers without being decrypted.

9. The encryption processing apparatus according to claim 8, wherein the processor performs a process of reducing number of coefficients of the first ciphertext, prior to obtaining a new ciphertext by using a ninth ciphertext with increased coefficients as input and a predetermined polynomial.

10. The encryption processing apparatus according to claim 8, wherein the processor performs the predetermined operation to perform a process involved in a fuzzy search using the first ciphertext that is input thereto.

11. The encryption processing apparatus according to claim 8, wherein the processor performs the predetermined operation to process a query based on the first ciphertext that is input thereto to an encrypted database.

12. A non-transitory computer-readable recording medium storing a program for causing the processor to perform the encryption processing method according to claim 7.

* * * * *